United States Patent
Iwai et al.

(10) Patent No.: US 11,212,026 B2
(45) Date of Patent: Dec. 28, 2021

(54) RADIO TRANSMISSION DEVICE AND TRANSMISSION METHOD

(71) Applicant: Panasonic Intellectual Property Corporation of America, Torrance, CA (US)

(72) Inventors: Takashi Iwai, Ishikawa (JP); Yoshio Urabe, Nara (JP); Takayuki Nakano, Ishikawa (JP); Tomohumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 91 days.

(21) Appl. No.: 16/620,722

(22) PCT Filed: May 17, 2018

(86) PCT No.: PCT/JP2018/019005
§ 371 (c)(1),
(2) Date: Dec. 9, 2019

(87) PCT Pub. No.: WO2019/008916
PCT Pub. Date: Jan. 10, 2019

(65) Prior Publication Data
US 2020/0127756 A1 Apr. 23, 2020

(30) Foreign Application Priority Data
Jul. 7, 2017 (JP) .............................. JP2017-133818

(51) Int. Cl.
*H04J 13/00* (2011.01)
*H04J 13/22* (2011.01)
(Continued)

(52) U.S. Cl.
CPC .......... *H04J 13/0062* (2013.01); *H04J 13/22* (2013.01); *H04L 27/04* (2013.01); *H04L 27/2634* (2013.01); *H04L 27/2637* (2013.01)

(58) Field of Classification Search
CPC . H04L 27/2613; H04L 27/2675; H04L 27/18; H04L 27/04; H04L 27/2634;
(Continued)

(56) References Cited

U.S. PATENT DOCUMENTS 10,129,064 B1 * 11/2018 Lee ................. H04L 27/2627
2010/0195479 A1 * 8/2010 Lipka .............. H04L 27/2636
370/203

(Continued)

OTHER PUBLICATIONS

International Search Report of PCT application No. PCT/JP2018/019005 dated Jul. 24, 2018.
(Continued)

*Primary Examiner* — Dady Chery
(74) *Attorney, Agent, or Firm* — Seed IP Law Group LLP

(57) ABSTRACT

A signal generator 10 generates an OOK (on-off keying) modulation signal by mapping a CAZAC (constant amplitude zero auto-correlation) sequence to N subcarriers (N being an integer that is greater than or equal to 2) arranged at a determined interval among M subcarriers (M being an integer that is greater than or equal to 3) that are adjacent in the frequency domain, carrying out inverse fast Fourier transform (IFFT) processing on the mapped CAZAC sequence, and carrying out Manchester coding on a time domain signal generated by the IFFT processing. A radio transmitter 107 transmits the OOK modulation signal.

6 Claims, 21 Drawing Sheets

(51) Int. Cl.
*H04L 27/04* (2006.01)
*H04L 27/26* (2006.01)

(58) Field of Classification Search
CPC ........... H04L 27/2637; H04L 25/03828; H04L 5/0007; H04L 25/4905; H04J 11/0073; H04J 11/0076; H04J 11/0069; H04J 13/0025; H04J 2211/005; H04J 13/0062; H04J 13/22; H04J 13/14; Y02D 30/70; H04W 52/0235; H04W 52/0229; H04W 84/12; H04W 88/06
See application file for complete search history.

(56) References Cited

U.S. PATENT DOCUMENTS

| | | | | |
|---|---|---|---|---|
| 2012/0327885 | A1* | 12/2012 | Chung | H04L 1/1671 370/329 |
| 2019/0372816 | A1* | 12/2019 | Si | H04L 27/2675 |

OTHER PUBLICATIONS

IEEE Std 802.11(TM)-2016, IEEE Standard for Information technology—Telecommunications and information exchange between systems, Local and metropolitan area networks—Specific requirements, Part 11: Wireless LAN Medium Access Control (MAC) and Physical Layer (PHY) Specifications, Dec. 14, 2016.
IEEE 802.11-17/0575r1, "Specification Framework for TGba", May 30, 2017.
IEEE 802.11-16/1144r0, "Further Investigation on WUR Performance", Sep. 12, 2016.
IEEE 802.11-17/0084rO, "High Level PHY Design", Jan. 17, 2017.
IEEE 802.11-17/0350r0, "Various Symbol Types for WUR", Mar. 13, 2017.
IEEE 802.11-17/0376r0, "Waveform Generation for Waveform Coding", Mar. 16, 2017.
IEEE 802.11-17/0659r3, "On the Coexistence of 802.11ax and 802.11ba Signals", May 10, 2017.

* cited by examiner

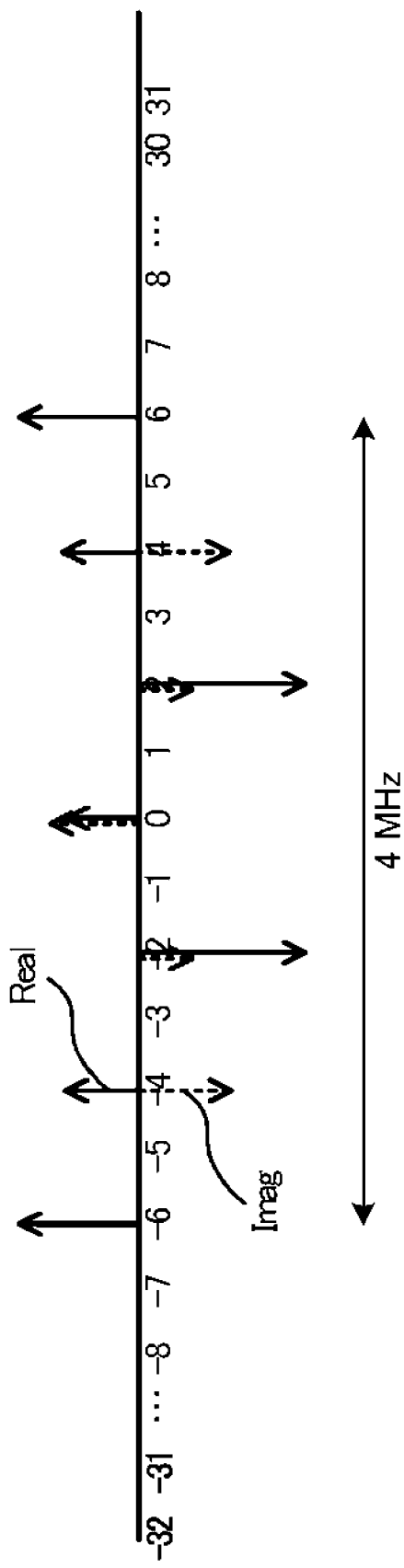

FIG. 12B

| ZC SEQUENCE OF SEQUENCE LENGTH = 7 AND SEQUENCE NUMBER 1 ||
|---|---|
| 0 | 1.00000000000000 + 0.00000000000000i |
| 1 | 0.623489801858734 - 0.781831482468030i |
| 2 | -0.900968867902419 - 0.433883739117558i |
| 3 | 0.623489801858733 + 0.781831482468030i |
| 4 | -0.900968867902419 - 0.433883739117558i |
| 5 | 0.623489801858734 - 0.781831482468030i |
| 6 | 1.00000000000000 + 0.00000000000000i |

FIG. 13

| ZC SEQUENCE NUMBER q | CM [dB] |
|---|---|
| 1 | 0.65 |
| 2 | 2.03 |
| 3 | 1.49 |
| 4 | 1.49 |
| 5 | 2.03 |
| 6 | 0.65 |

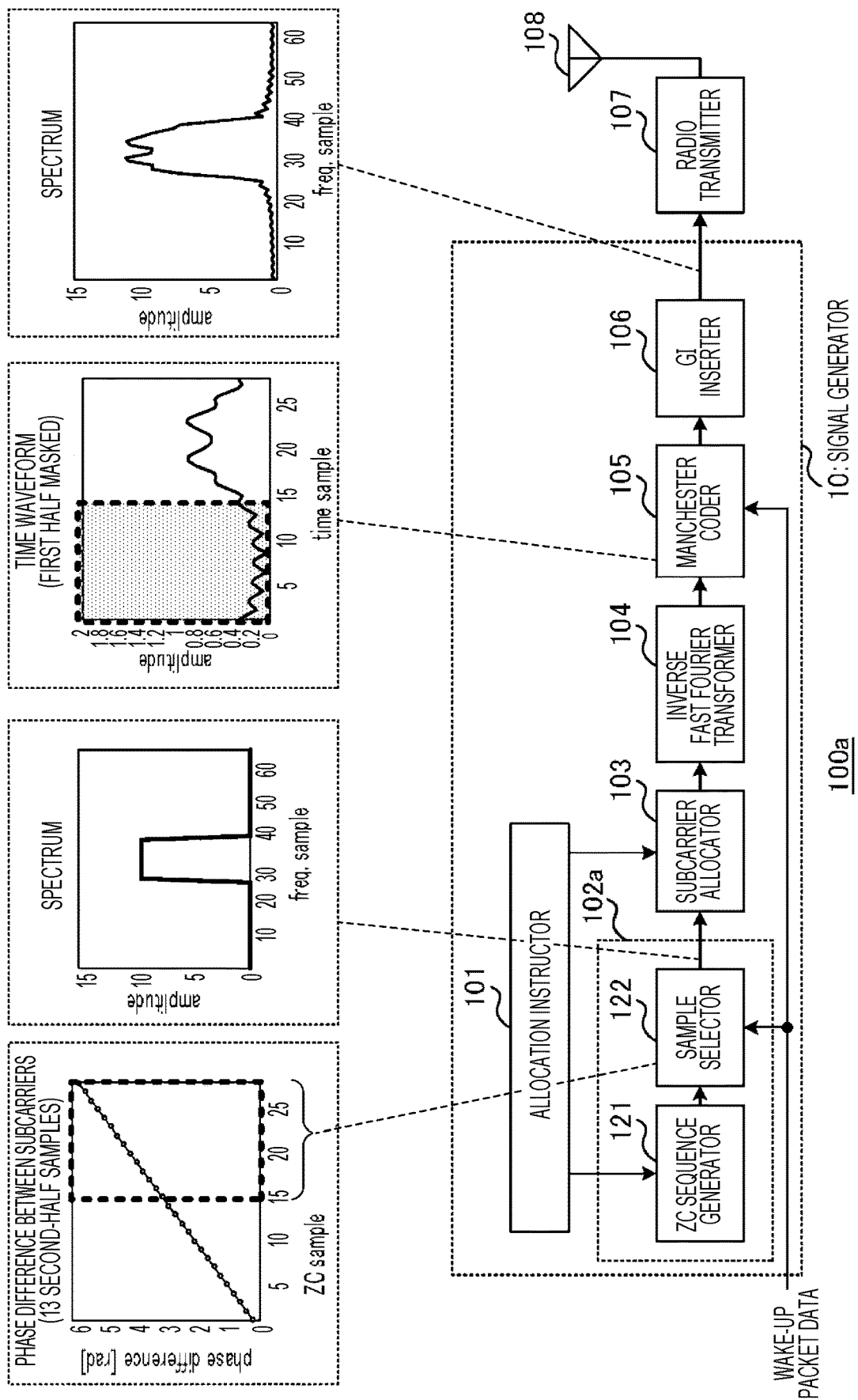

FIG. 21

| BSS-ID | ZC SEQUENCE NUMBER q |
|--------|----------------------|
| A      | 1                    |
| B      | 2                    |
| C      | 3                    |

FIG. 22

| TRANSMISSION BUFFER SIZE | ZC CYCLIC SHIFT AMOUNT |
|--------------------------|------------------------|
| LARGE                    | 1                      |
| SMALL                    | 2                      |

FIG.24

| TARGET TERMINAL NUMBER | ZC CYCLIC SHIFT AMOUNT |
|---|---|
| a | 1 |
| b | 2 |
| c | 3 |

FIG.25

| TRANSMISSION BUFFER SIZE | ZC SEQUENCE NUMBER q |
|---|---|
| LARGE | 1 |
| SMALL | 2 |

RADIO TRANSMISSION DEVICE AND TRANSMISSION METHOD

TECHNICAL FIELD

The present disclosure relates to a radio transmission device and a transmission method.

BACKGROUND ART

In the Task Group ba of the IEEE (the Institute of Electrical and Electronics Engineers) 802.11 Working Group, the formulation of technical specifications for IEEE 802.11ba (hereinafter referred to as "11ba") which is aimed at reducing the power consumption of terminals is advancing in the WUR (Wake-up Radio) Study Group.

Wake-up radio (WUR) is used together with primary connectivity radio (PCR), and is used for waking up PCR from a sleep state. For PCR, the scheme of the wireless LAN standard specification described in NPL 1, for example, or a scheme that is scheduled for future standardization such as IEEE 802.11ax is used.

Furthermore, in 11ba, the standardization of "wake-up packets" that transmit only control information is advancing. PCR is woken up from a sleep state due to the reception of a wake-up packet.

For modulation of the payload portion of a wake-up packet, consideration is being given to using OOK (on-off keying) with Manchester code. Furthermore, consideration is being given to generating OOK waveforms by setting determined values (coefficients) for subcarriers of the same parameters as IEEE802.11 OFDM PHY (in other words, OFDM (orthogonal frequency division multiplexing) subcarriers) (see NPL 1, for example). It should be noted that a subcarrier is also referred to as a "tone".

CITATION LIST

Non Patent Literature

NPL 1: IEEE Std 802.11TM-2016
NPL 2: IEEE 802.11ba framework (17/0575r1)
NPL 3: IEEE 802.11-16/1144r0 "Further Investigation on WUR Performance"
NPL 4: IEEE 802.11-17/0084r0 "High Level PHY Design"

SUMMARY OF INVENTION

However, consideration has not been sufficiently given to a method for generating an OOK modulation signal that uses Manchester code of an OFDM base.

An embodiment of the present disclosure facilitates providing a radio transmission device and a transmission method with which it is possible to appropriately generate an OOK modulation signal that uses Manchester code of an OFDM base.

A radio transmission device according to an embodiment of the present disclosure is provided with: a signal generation circuit that generates an OOK (on-off keying) modulation signal by mapping a CAZAC (constant amplitude zero auto-correlation) sequence to N subcarriers (N being an integer that is greater than or equal to 2) arranged at a determined interval among M subcarriers (M being an integer that is greater than or equal to 3) that are adjacent in the frequency domain, carrying out inverse fast Fourier transform (IFFT) processing on the mapped CAZAC sequence, and carrying out Manchester coding on a time domain signal generated by the IFFT processing; and a transmitter that transmits the OOK modulation signal.

A transmission method according to an embodiment of the present disclosure includes: generating an OOK (on-off keying) modulation signal by mapping a CAZAC (constant amplitude zero auto-correlation) sequence to N subcarriers (N being an integer that is greater than or equal to 2) arranged at a determined interval among M subcarriers (M being an integer that is greater than or equal to 3) that are adjacent in the frequency domain, carrying out inverse fast Fourier transform (IFFT) processing on the mapped CAZAC sequence, and carrying out Manchester coding on a time domain signal generated by the IFFT processing; and transmitting the generated OOK modulation signal.

It should be noted that general or specific embodiments hereof may be realized by a system, a device, a method, an integrated circuit, a computer program, or a recording medium, and may be realized by any combination of a system, a device, a method, an integrated circuit, a computer program, and a recording medium.

According to an embodiment of the present disclosure, it is possible to appropriately generate an OOK modulation signal that uses Manchester code of an OFDM base.

Additional benefits and advantages in an embodiment of the present disclosure will be made apparent from the specification and drawings. The benefits and/or advantages may each be provided by several of the embodiments and the features disclosed in the specification and drawings, and need not all be provided in order to obtain one or more of the same features.

BRIEF DESCRIPTION OF DRAWINGS

FIG. 12A is a drawing depicting an example of allocating an OFDM subcarrier in the frequency domain according to embodiment 1.

FIG. 12B is a drawing depicting an example of a ZC sequence according to embodiment 1.

FIG. 13 is a drawing depicting an example of the relationship between a ZC sequence number and a CM.

FIG. 19B is a drawing depicting an example configuration and an example operation of the radio transmission device according to embodiment 3.

FIG. 21 is a drawing depicting an example of an association between a BSS-ID and a ZC sequence number according to embodiment 4.

FIG. 22 is a drawing depicting an example of an association between terminal information and a ZC cyclic shift amount according to embodiment 4.

FIG. 24 is a drawing depicting an example of an association between a terminal number and a ZC cyclic shift amount according to embodiment 4.

FIG. 25 is a drawing depicting an example of an association between terminal information and a ZC sequence number according to embodiment 4.

DESCRIPTION OF EMBODIMENTS

Hereinafter, embodiments of the present disclosure will be described in detail with reference to the drawings.

Figure 1:
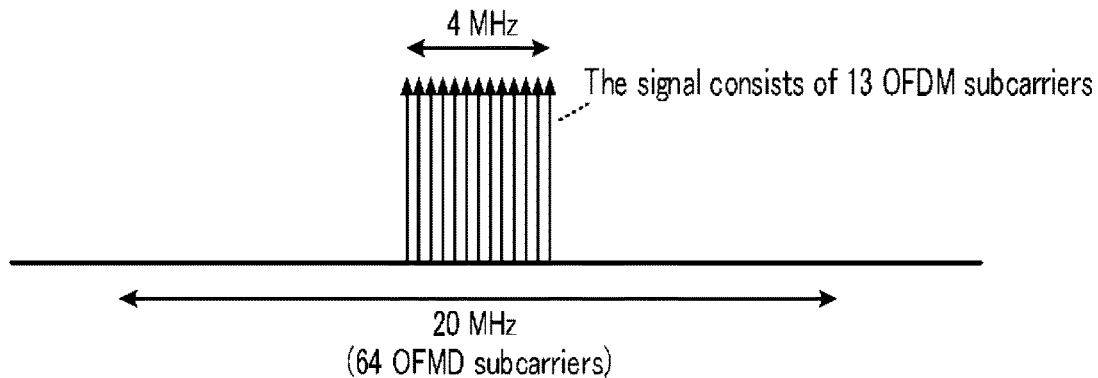
FIG. 1 is a drawing depicting an example of allocating OFDM subcarriers in the frequency domain.

FIG. 1 depicts an example of allocating subcarriers (OFDM subcarriers) in the frequency domain for a WUR signal. As depicted in FIG. 1, consideration is being given to setting coefficients for 13 subcarriers (corresponding to a 4.06-MHz bandwidth; written simply as "4 MHz" hereinafter) in the central section within a 20-MHz bandwidth (64 OFDM subcarriers at subcarrier intervals of 312.5 kHz, for example) (see NPL 2, 3, and 4, for example).

NPL 3 discloses an example of a method for generating the information symbols "0/1" for an OOK modulation signal that uses Manchester code (hereinafter referred to as a "Manchester coded OOK signal") of the time domain being studied in 11ba. Specifically, the information symbol "0" is defined as a transition from a high (ON) to a low (OFF) signal level within a symbol, and the information symbol "1" is defined as a transition from a low (OFF) to a high (ON) signal level within a symbol.

Figure 2:
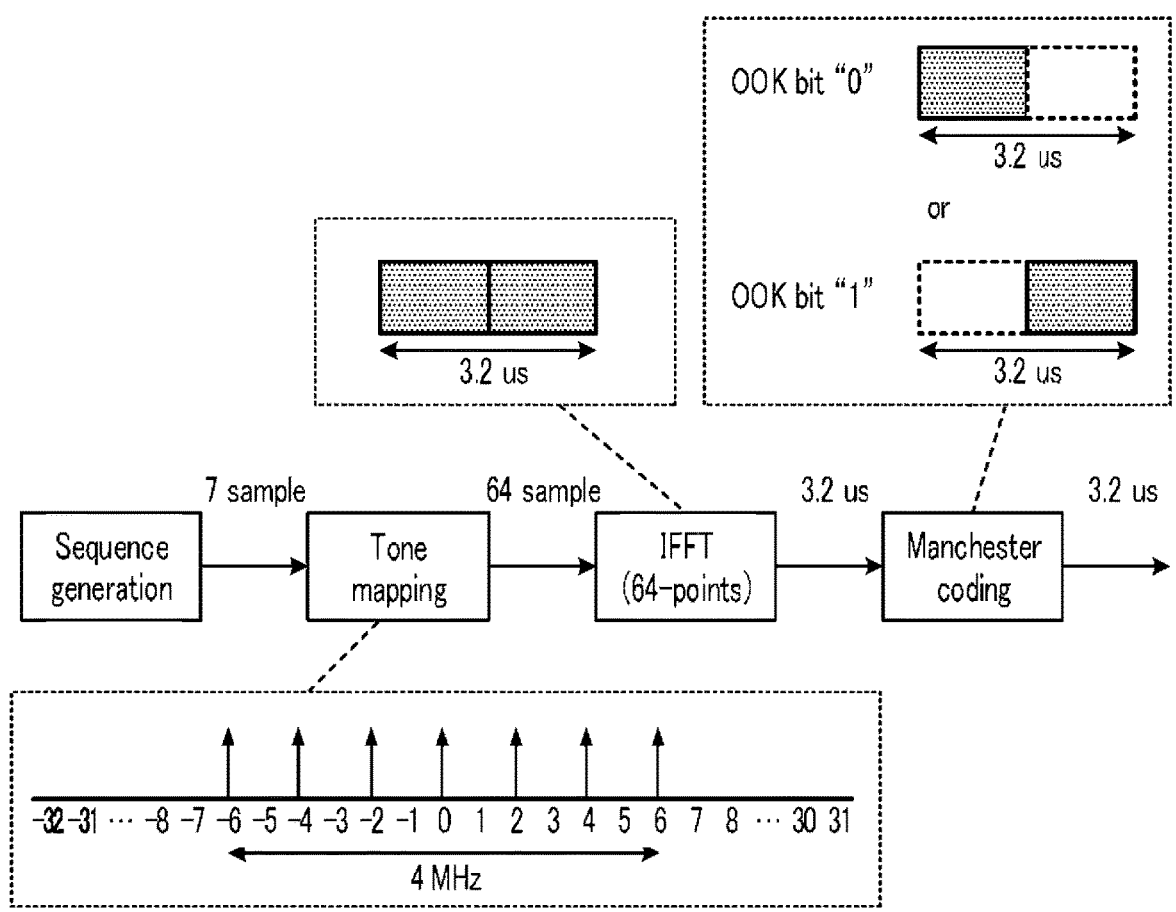
FIG. 2 is a drawing depicting an example of Manchester coding processing.

FIG. 2 depicts an example of the allocation of coefficients to 13 subcarriers, in which fixed coefficients of seven samples (coefficients with which all samples have an amplitude of 1.0) have been allocated at two-subcarrier intervals (see NPL 3, for example). As depicted in FIG. 2, coefficients are allocated to subcarriers (even-numbered subcarriers) at two-subcarrier intervals within a 4-MHz band, and therefore the time waveform obtained after IFFT (inverse fast Fourier transform) processing in a 3.2-us FFT (fast Fourier transform) segment becomes a waveform of a 1.6-us period. Furthermore, in the Manchester coding depicted in FIG. 2, a Manchester coded OOK signal (OOK bit) is generated from the 3.2-us time waveform obtained by the IFFT processing, by extracting a 1.6-us waveform with the signal in the first half segment or the second half segment being masked out.

Figure 3:
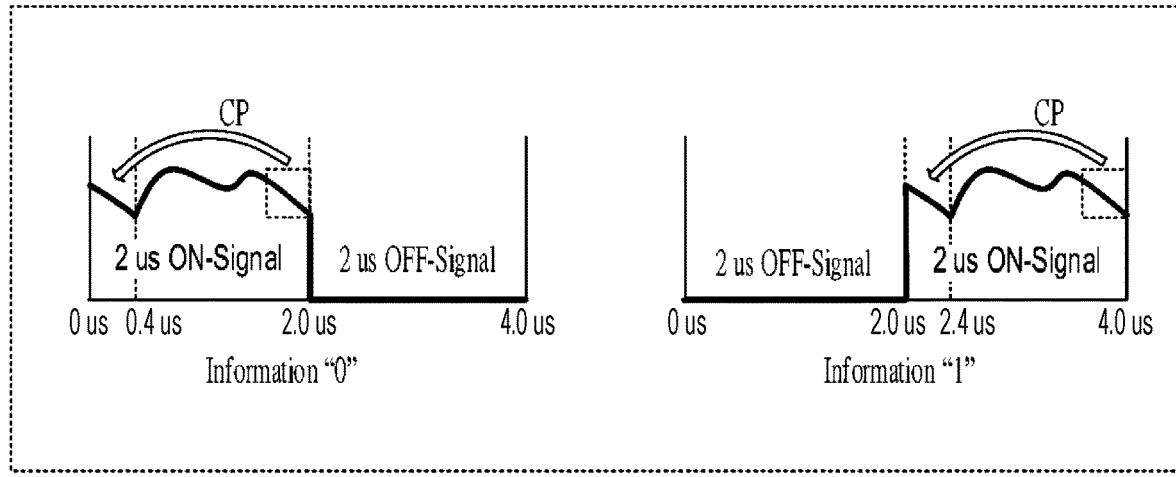
FIG. 3 is a drawing depicting an example of a Manchester coded OOK signal.

It should be noted that a 4-us symbol is obtained by a 0.8-us guard interval (GI) being added to the 3.2-us waveform, similar to IEEE 802.11 OFDM PHY. For example, as depicted in FIG. 3, a 4-us symbol consisting of a 2-us ON signal and a 2-us OFF signal is obtained by adding a 0.4-us CP (cyclic prefix) as a GI immediately before a 1.6-us waveform corresponding to an ON signal within the Manchester coded OOK signal (see NPL 3, for example).

As a WUR signal, it is preferable that the two characteristics of flat characteristics in the frequency domain and low CM (cubic metric)/PAPR (peak to average power ratio) characteristics both be established. With flat characteristics in the frequency domain, the effect of it being possible to enlarge the total transmission power of the WUR signal is obtained. Furthermore, with low CM/PAPR characteristics, the effect of it being possible to reduce the power consumption of access points (AP) and terminals is obtained.

A CAZAC (constant amplitude zero auto-correlation) sequence is a sequence that has flat characteristics in the frequency domain and low CM/PAPR characteristics. Furthermore, a Zadoff-Chu (ZC) sequence is an example of a CAZAC sequence.

However, consideration has not been sufficiently given to the details of a method for generating a Manchester coded OOK signal in the case where a ZC sequence is used.

Figure 4:
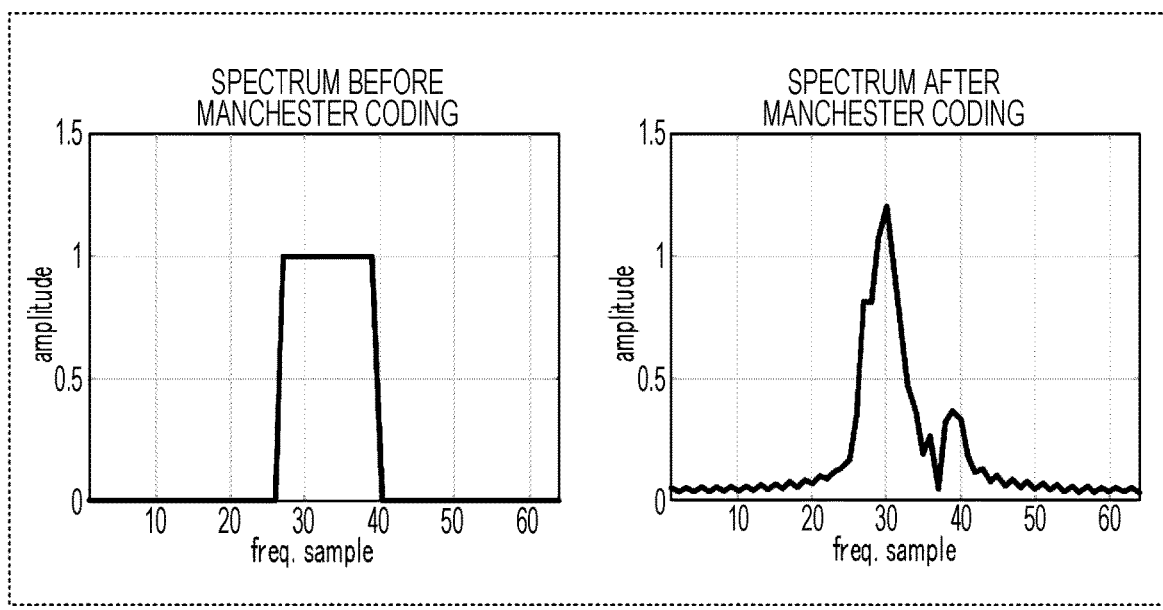
FIG. 4 is a drawing depicting an example of spectra before and after Manchester coding.

For example, similar to FIG. 1, when 13 subcarriers are allocated for a WUR signal, if a ZC sequence having a sequence length of 13 is simply applied, the OOK modulation signal obtained after Manchester coding (after masking out) is not able to maintain flat characteristics in the frequency domain, as depicted in FIG. 4. Furthermore, as depicted in FIG. 4, the transmission spectrum spreads beyond the band of the 13 carriers to which coefficients of the ZC sequence have been allocated, which therefore causes interference in other communication. This kind of change in the spectrum shape and expansion of the bandwidth is not limited to an OOK modulation signal implemented by means of a ZC sequence, and is a common problem in the case where Manchester coding implemented by means of masking out is applied.

Thus, in an embodiment of the present disclosure, a description will be given regarding a method for generating a Manchester coded OOK signal that uses a ZC sequence having flat characteristics in the frequency domain and low CM/PAPR characteristics.

[Overview of Communication System]

A communication system according to an embodiment of the present disclosure is provided with a radio transmission device 100 and a radio reception device 500. The radio transmission device 100 is an access point (AP) that transmits a wake-up packet that uses a Manchester coded OOK signal, for example. Furthermore, the radio reception device 500 is a terminal that receives the wake-up packet.

Figure 5:
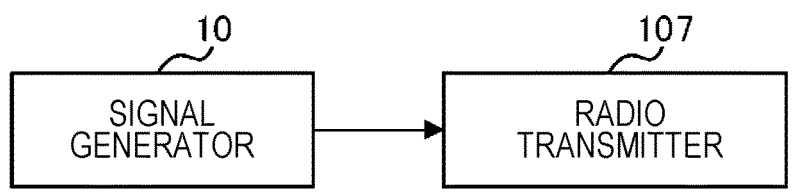
FIG. 5 is a block diagram depicting the configuration of part of a radio transmission device according to embodiment 1.

FIG. 5 is a block diagram depicting the configuration of part of the radio transmission device 100 according to an embodiment of the present disclosure. In the radio transmission device 100 depicted in FIG. 5, a signal generator 10 maps a CAZAC (constant amplitude zero auto-correlation) sequence to N subcarriers (N being an integer that is greater than or equal to 2) arranged at determined intervals within M subcarriers (M being an integer that is greater than or equal to 3) that are adjacent in the frequency domain, carries out inverse fast Fourier transform (IFFT) processing on the mapped CAZAC sequence, carries out Manchester coding on a time domain signal generated by the IFFT processing, and thereby generates an OOK (on-off keying) modulation signal. A radio transmitter 107 transmits the OOK modulation signal.

[Configuration of Radio Transmission Device]

Figure 6:
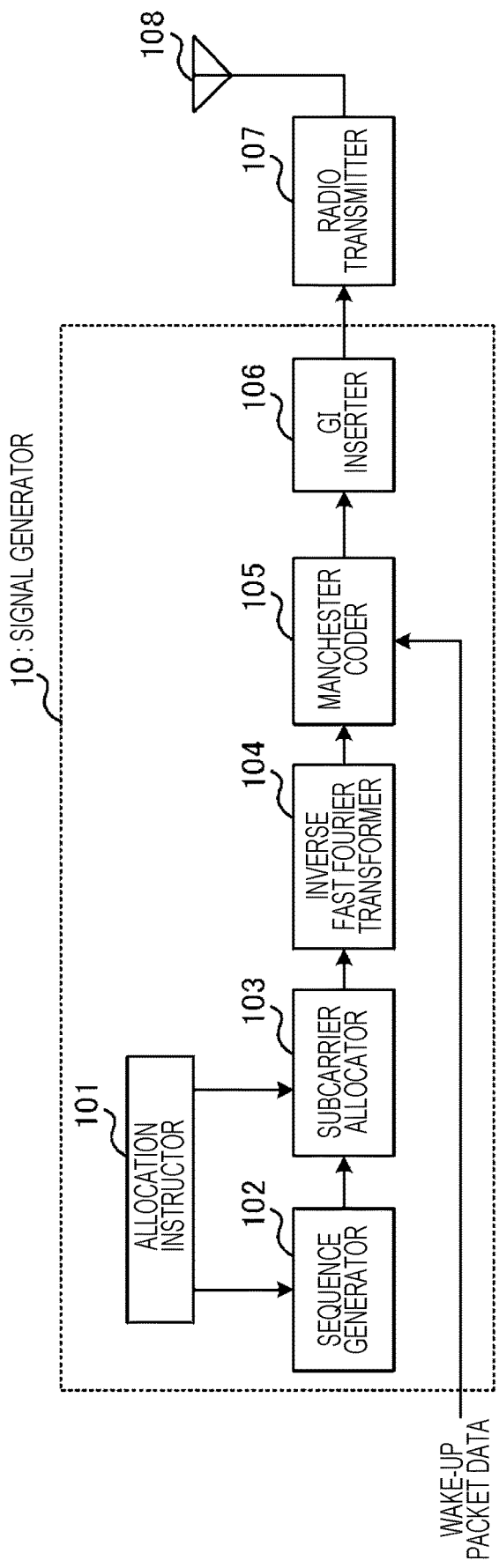
FIG. 6 is a block diagram depicting an example configuration of the radio transmission device according to embodiment 1.

FIG. 6 is a block diagram depicting the configuration of the radio transmission device 100 according to the present embodiment. The radio transmission device 100 generates and transmits wake-up packet data to the radio reception device 500.

In FIG. 6, the radio transmission device 100 has an allocation instructor 101, a sequence generator 102, a subcarrier allocator 103, an inverse fast Fourier transformer 104, a Manchester coder 105, a GI inserter 106, a radio transmitter 107, and an antenna 108. It should be noted that from the allocation instructor 101 to the GI inserter 106 constitutes a Manchester coded OOK signal generator 10 that generates a Manchester coded OOK signal.

The allocation instructor 101 notifies information indicating the number of subcarriers of a band to which a wake-up packet is to be allocated and a subcarrier interval to the sequence generator 102 and the subcarrier allocator 103. For example, the allocation instructor 101 may instruct 13 subcarriers (corresponding to a 4.06-MHz bandwidth) in the central section within 64 OFDM subcarriers (20-MHz bandwidth) as the number of subcarriers of a band to which a wake-up packet is to be allocated, and notify a two-subcarrier interval as the subcarrier interval. It should be noted that the number of subcarriers and the subcarrier interval notified by the allocation instructor 101 are not restricted to these values.

The sequence generator 102 generates a CAZAC sequence (a ZC sequence, for example) on the basis of information that is input from the allocation instructor 101, and outputs the CAZAC sequence to the subcarrier allocator 103. It should be noted that the detailed operation of the sequence generation method in the sequence generator 102 will be described later.

The subcarrier allocator 103 allocates a sequence that is input from the sequence generator 102, to frequency resources (subcarriers), on the basis of information that is input from the allocation instructor 101 (number of subcarriers, subcarrier interval, and the like). The subcarrier allocator 103 outputs a frequency domain signal (64 OFDM subcarriers) obtained after subcarrier allocation, to the inverse fast Fourier transformer 104. It should be noted that the detailed operation of the subcarrier allocation method in the subcarrier allocator 103 will be described later.

The inverse fast Fourier transformer 104 carries out IFFT (inverse Fourier transform) processing on the frequency domain signal that is input from the subcarrier allocator 103, and obtains a time domain signal (a 3.2-us time domain signal, for example).

The Manchester coder 105 carries out Manchester coding on the time domain signal that is input from the inverse fast Fourier transformer 104. For example, the Manchester coder 105 masks out a 1.6-us segment that is either one of the second half segment and the first half segment of the time domain signal (a 3.2-us signal, for example) that is input from the inverse fast Fourier transformer 104, in accordance with the wake-up packet data (an information symbol "0" or "1") that is input, extracts the waveform (ON signal) of the other 1.6-us segment, and thereby generates a Manchester coded OOK signal.

Figure 7:
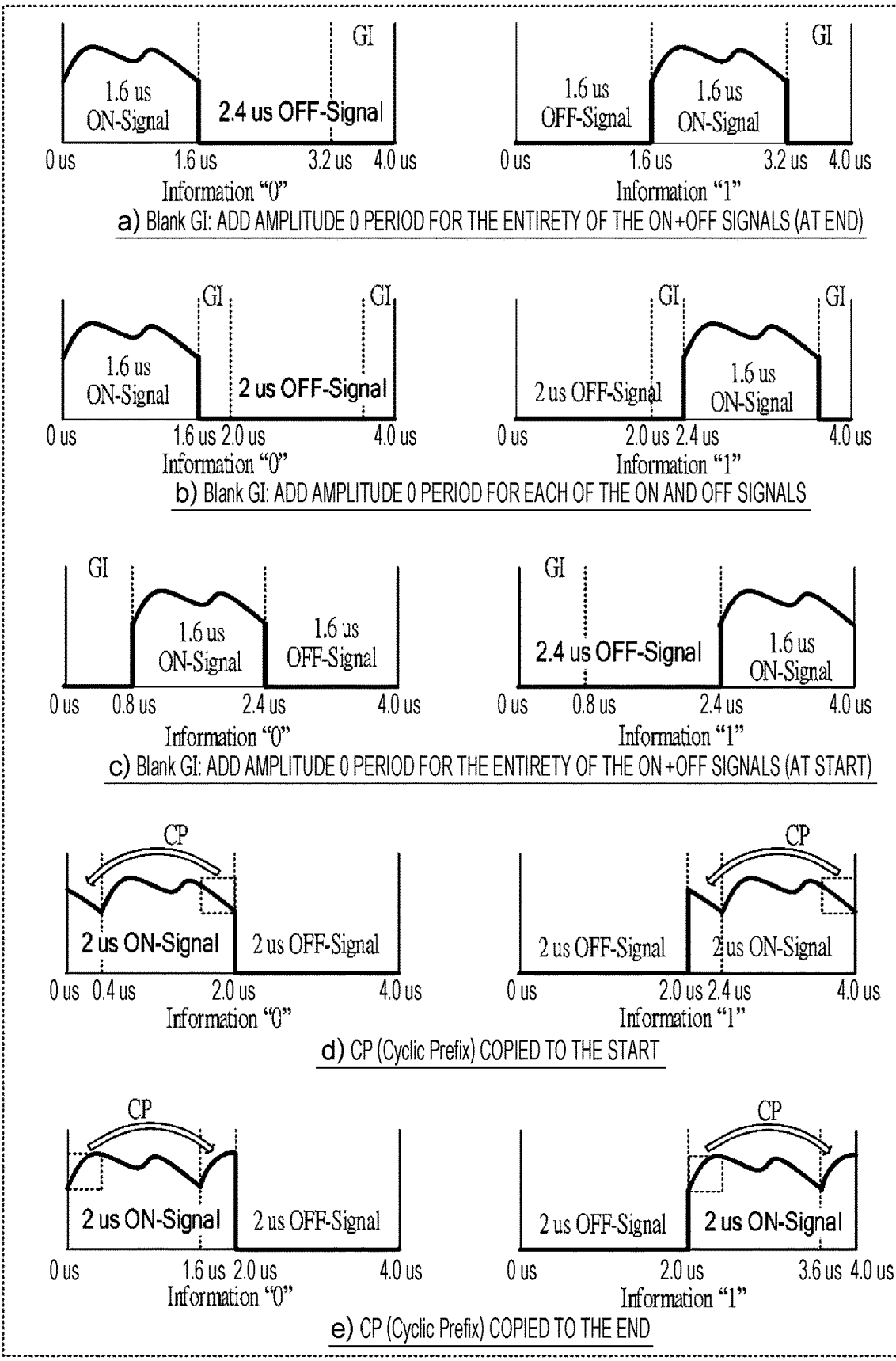
FIG. 7 is a drawing depicting an example of an operation for inserting a GI.

The GI inserter 106 adds a GI (guard interval) to the ON signal within the Manchester coded OOK signal that is input from the Manchester coder 105. The GI inserter 106, for example, may add a period having a fixed amplitude of 0 (referred to as a blank GI) for the entirety of the ON signal and OFF signal (entirety of the ON+OFF signals) as depicted in FIGS. 7a and c, or may add a GI for each of the ON signal and OFF signal as depicted in FIG. 7b. Alternatively, the GI inserter 106 may add, as a GI, a CP (cyclic prefix) in which part of the ON signal is copied to the start or the end, rather than a blank GI, as depicted in FIGS. 7d and e. By adding a GI, it is possible to reduce inter-symbol interference (ISI) caused by multiple paths or filter responses.

The radio transmitter 107 carries out determined radio transmission processing such as D/A conversion and up-conversion to a carrier frequency with respect to the Manchester coded OOK signal that is input from the GI inserter 106, and transmits the signal obtained after the radio transmission processing to the antenna 108.

[Configuration of Radio Transmission Device when Used Together with PCR Processing]

Figure 8:
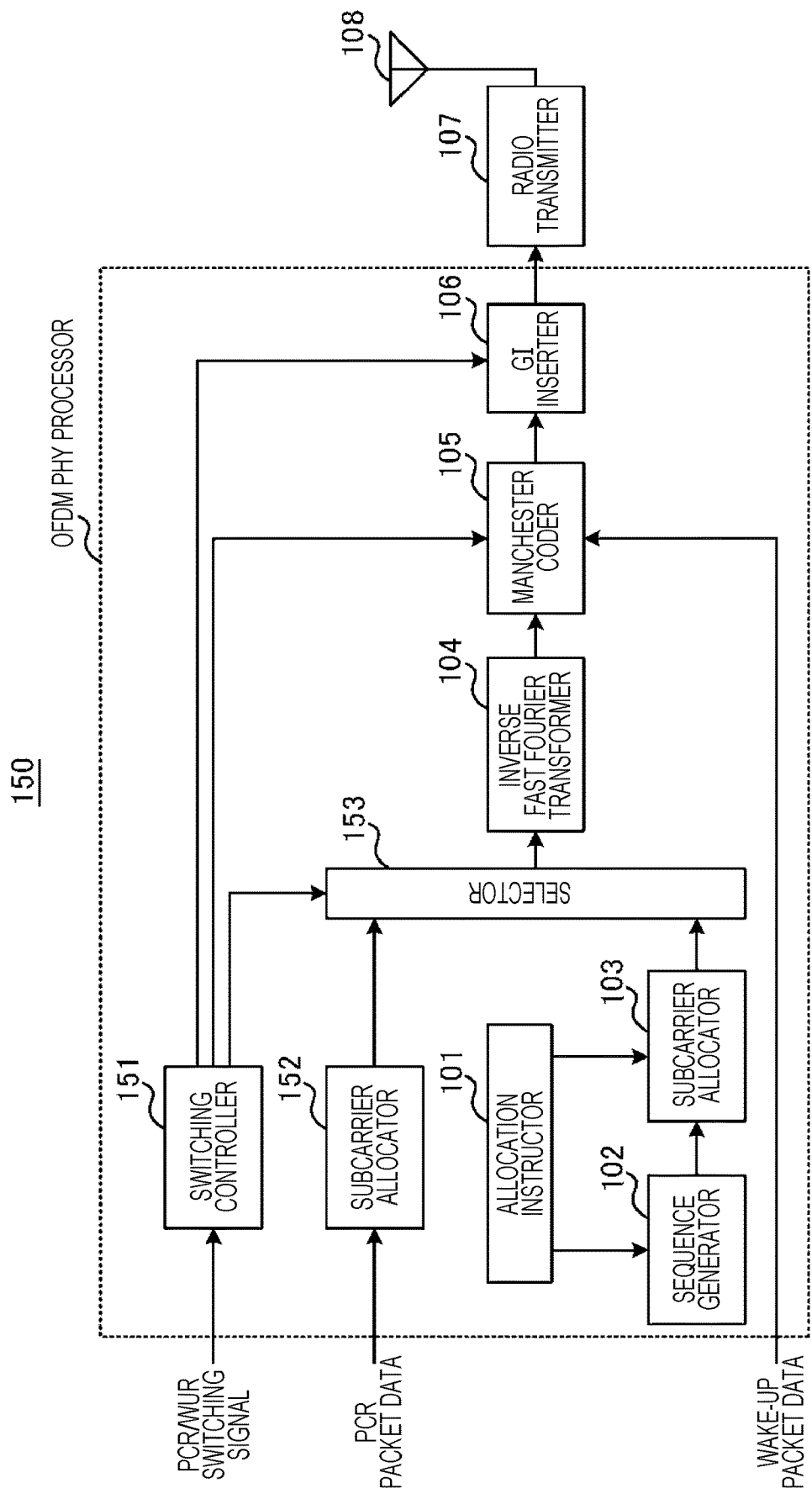
FIG. 8 is a block diagram depicting an example configuration of the radio transmission device when used together with PCR processing according to embodiment 1.

FIG. 8 is a block diagram depicting the configuration of a radio transmission device 150 when PCR processing and WUR processing are both used. It should be noted that, in FIG. 8, configurations that are the same as in the radio transmission device 100 depicted in FIG. 6 are denoted by the same reference numbers, and explanations thereof have been omitted.

Specifically, the radio transmission device 150 depicted in FIG. 8 has a switching controller 151 that controls switching between PCR/WUR, a PCR subcarrier allocator 152 that carries out subcarrier allocation for PCR packet data, and a selector 153 that carries out PCR/WUR switching, newly provided to the configuration of the radio transmission device 100 depicted in FIG. 6.

The switching controller 151 controls the selection of PCR/WUR and switching of the operations of the Manchester coder 105 and the GI inserter 106. Specifically, the switching controller 151 carries out control to set the function of the Manchester coder 105 to OFF when PCR is in effect. Furthermore, the switching controller 151, with respect to the GI inserter 106, controls the GI insertion operation carried out according to each specification when PCR is in effect and when WUR is in effect. For example, in a case where a WUR signal depicted in FIG. 7c is generated, the temporal operation (timing) of the GI inserter 106 is the same when PCR is in effect and when WUR is in effect, and the switching controller 151 switches between CP insertion (when PCR is in effect) and blank GI insertion (when WUR is in effect).

The selector 153 selects PCR packet data that is input from the subcarrier allocator 152 when PCR is in effect, and selects wake-up packet data that is input from the subcarrier allocator 103 when WUR is in effect, as output data for the inverse fast Fourier transformer 104, in accordance with control from the switching controller 151.

The inverse fast Fourier transformer 104 and the GI inserter 106 are both used for PCR/WUR. Furthermore, the function of the Manchester coder 105 is set to OFF when PCR is in effect.

[Configuration of Wireless Reception Device]

Figure 9:
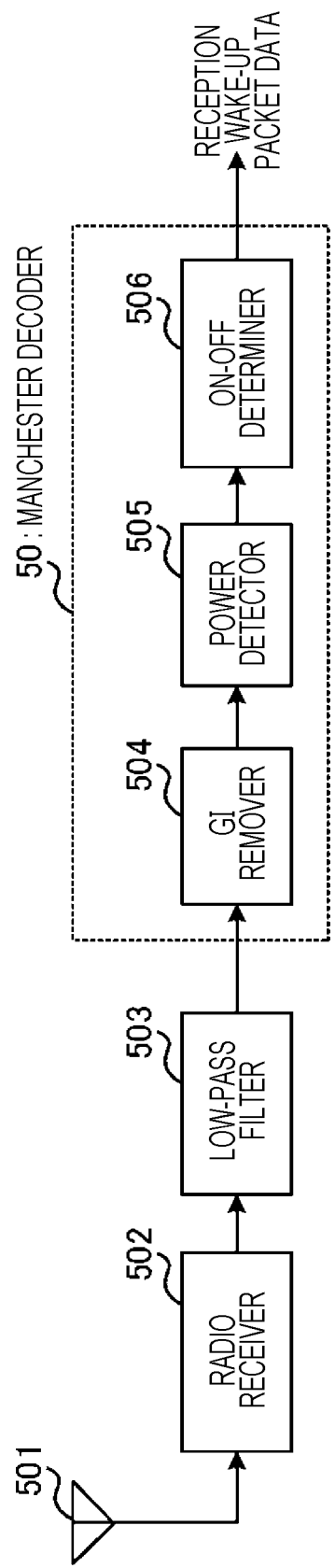
FIG. 9 is a block diagram depicting an example configuration of a radio reception device according to embodiment 1.

FIG. 9 is a block diagram depicting the configuration of the radio reception device 500 according to the present embodiment. The radio reception device 500 receives wake-up packet data that is received from the radio transmission device 100. It should be noted that the radio reception device 500 carries out the determination of information symbols (0 or 1) of a Manchester coded OOK signal on the basis of the power (signal level).

In FIG. 9, the radio reception device 500 has an antenna 501, a radio receiver 502, a low-pass filter 503, a GI remover 504, a power detector 505, and an ON-OFF determiner 506. It should be noted that the GI remover 504, the power detector 505, and the ON-OFF determiner 506 constitute a Manchester decoder 50.

The radio receiver 502 receives a wake-up packet transmitted from the radio transmission device 100, via the antenna 501, carries out determined radio reception processing such as down-conversion and A/D conversion on the received signal, and outputs the signal obtained after the radio reception processing to the low-pass filter 503.

The low-pass filter 503 carries out filter processing that cuts high frequency components so as to suppress noise components, on the signal that is input from the radio receiver 502.

The GI remover 504 carries out processing to remove GI components that have been inserted by the radio transmission device 100, from the signal that is input from the low-pass filter 503.

The power detector 505 detects the power of the signal that is input from the GI remover 504. Specifically, the power detector 505 obtains the total power of each of the first half 1.6 us and the second half 1.6 us of an information symbol segment, in order to carry out Manchester decoding.

The ON-OFF determiner 506 carries out a magnitude comparison of the total power of the first half and the total power of the second half of the information symbol segment obtained by the power detector 505, carries out a determination of the information symbols, and outputs wake-up packet data.

[Operation of Radio Transmission Device 100]

Next, the operation of the aforementioned radio transmission device 100 will be described in detail.

Figure 10:
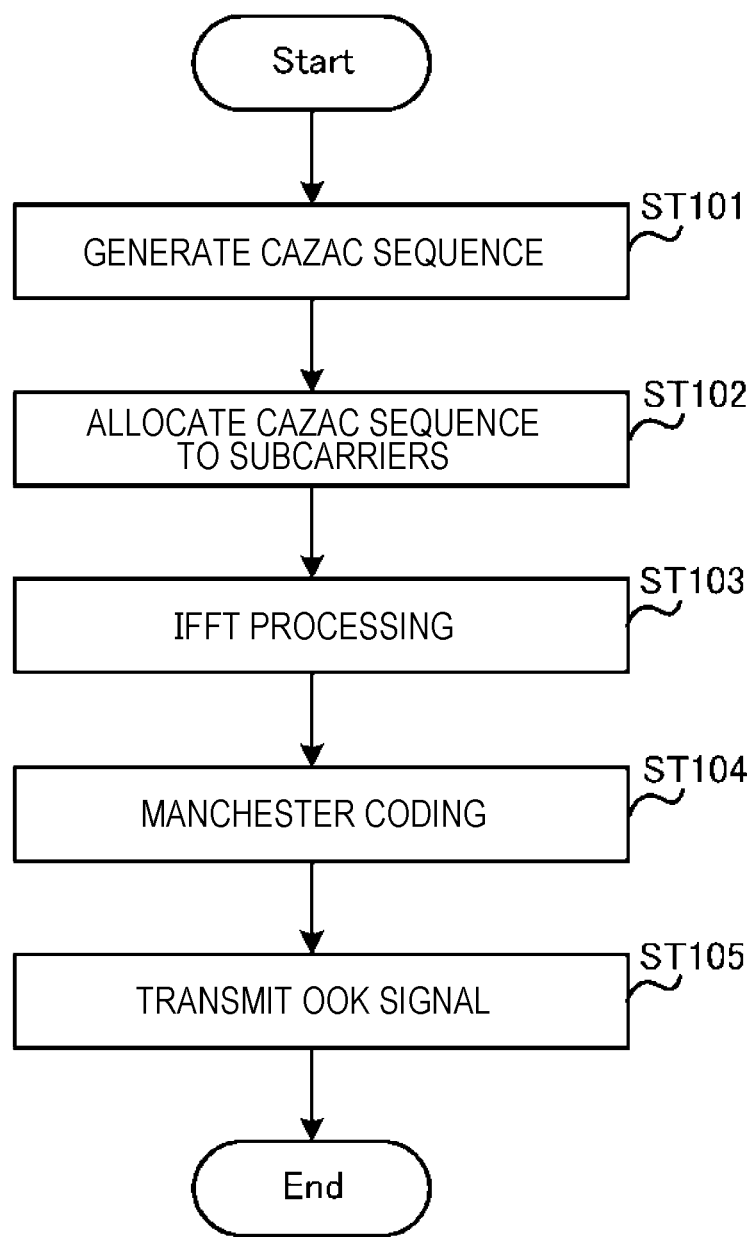
FIG. 10 is a flowchart depicting an example operation of the radio transmission device according to embodiment 1.

FIG. 10 is a flowchart depicting the operation of the radio transmission device 100 (FIG. 6).

The sequence generator 102 generates a CAZAC sequence (ST101).

For example, the sequence generator 102 generates the ZC sequence indicated in expression (1) hereinafter, as a CAZAC sequence.

[Math. 1]
$$x_q(m) = e^{-j\frac{\pi qm(m+1)}{N_{ZC}}}, 0 \le m \le N_{ZC} - 1 \quad (1)$$

Here, q indicates the sequence number of a ZC sequence, and is an integer that is $1 \le q \le N_{ZC}-1$. Furthermore, $N_{ZC}$ indicates the sequence length of the ZC sequence. Furthermore, m indicates the number of a sample making up the ZC sequence.

For example, $N_{ZC}$ may be the value of a prime number that is close to the value of ceil(M/P) (where the function ceil(x) is a function that returns the smallest integer value that is greater than or equal to x) on the basis of the number of subcarriers (M) of the band to which the wake-up packet is allocated and the subcarrier interval (P) notified from the allocation instructor 101. In other words, the sequence length $N_{ZC}$ may be the smallest prime number that is greater than or equal to a value obtained by dividing the number of subcarriers (M) by a determined interval (P).

Figure 11:
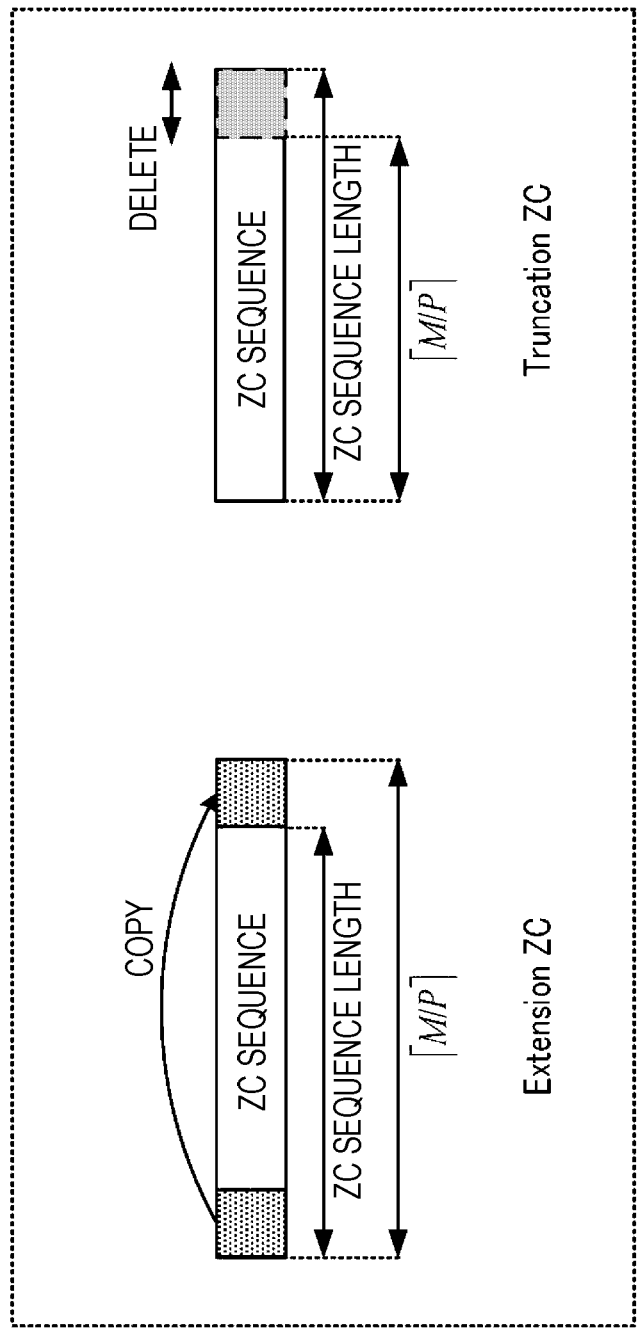
FIG. 11 is a drawing depicting an example of Extension ZC and Truncation ZC.

As an example, in the present embodiment, M=13 and P=2, and $N_{ZC}$ is taken as 7, which is a prime number that is close to the value of ceil(13/2) (=7). It should be noted that, in a case where ceil(M/P) and the ZC sequence length are different, the sequence generator 102 may use a method with which part of the generated ZC sequence is repeated (extension ZC) or a method with which part of the generated ZC sequence is deleted (truncation ZC), as depicted in FIG. 11, in order to align the ZC sequence length with ceil(M/P).

Next, the subcarrier allocator 103 allocates the ZC sequence generated in the sequence generator 102 to subcarriers, on the basis of the number of subcarriers (M) of the band to which the wake-up packet is allocated and the subcarrier interval (P) (ST102 in FIG. 10).

FIG. 12A depicts a subcarrier allocation example for a ZC sequence in a case where, of the band to which the wake-up packet is allocated, the number of subcarriers M=13, the subcarrier interval P=2, and sequence length $N_{ZC}$ of the ZC sequence=7. Furthermore, FIG. 12B depicts, as an example, the value of each sample m=0 to 6 of a ZC sequence for sequence length $N_{ZC}$=7 and sequence number q=1.

The subcarrier allocator 103 allocates a ZC sequence at two-subcarrier intervals (P=2) in the location of the subcarriers (M=13) of the band to which the wake-up packet notified from the allocation instructor 101 is allocated, as depicted in FIG. 12A. In other words, the subcarrier allocator 103 maps a ZC sequence to 7 (N=7) subcarriers arranged at determined intervals (P=2) among 13 (M=13) subcarriers that are adjacent in the frequency domain.

Then, the inverse fast Fourier transformer 104 carries outs IFFT processing on a frequency domain signal in which the ZC sequence has been mapped to subcarriers (ST103), and the Manchester coder 105 carries out Manchester coding (masking out) on a time domain signal obtained after the IFFT processing and generates a Manchester coded OOK signal (ST104). Then, the radio transmitter 107 transmits the Manchester coded OOK signal to the radio reception device 500 (ST105).

Here, the ZC sequence has the characteristic of maintaining ZC sequence characteristics even after the Fourier transform. Thus, as a result of allocating a ZC sequence to subcarriers at two-subcarrier intervals, the waveform in the time domain obtained after IFFT becomes a signal in which a ZC sequence having a length of 1.6 us is repeated for two periods. In other words, the Manchester coder 105 masks out either one of the ZC sequences (corresponding to an OFF signal) having a length of 1.6 us repeated for two periods, and extracts the other (corresponding to an ON signal). That is, the Manchester coded OOK signal (ON signal of the OOK modulation signal obtained after masking out) is a ZC sequence having a length of 1.6 us. Thus, the Manchester coded OOK signal has both the flat characteristics in the frequency domain and the low CM/PAPR characteristics possessed by a ZC sequence.

As described above, in the present embodiment, the radio transmission device 100 maps a CAZAC sequence (ZC sequence) to subcarriers at a determined interval, carries out IFFT processing on a frequency domain signal in which the CAZAC sequence has been mapped, carries out Manchester coding on a time domain signal obtained after the IFFT processing, and thereby generates a Manchester coded OOK signal. Due to this processing, in the generated Manchester coded OOK signal, it is possible to maintain flat characteristics in the frequency domain and low CM/PAPR characteristics which are characteristics of a ZC sequence.

Thus, according to the present embodiment, it is possible to appropriately generate an OOK modulation signal that uses Manchester code of an OFDM base. WUR reception performance can thereby be improved.

Furthermore, by obtaining flat characteristics in the frequency domain in the Manchester coded OOK signal (namely a WUR signal), it is possible to increase the total transmission power of the WUR signal in the radio transmission device 100 even in a case where there is a limit to the power density level (transmission power per 1 MHz, for example) due to a legal regulation or the like. Furthermore, due to a frequency diversity effect, it is possible improve the detection performance for a WUR signal in the radio reception device 500. As an example of a specific effect, it is possible to suppress a deterioration in performance caused by a deterioration in the quality of a partial band due to frequency selectivity.

Furthermore, by obtaining low CM/PAPR characteristics in the Manchester coded OOK signal (namely a WUR signal), the required average transmission power can be obtained even with a transmitter having a low maximum transmission power, and it is therefore possible to reduce the power consumption of the radio transmission device 100.

Modified Example 1 of Embodiment 1

It should be noted that, in the present embodiment, a description has been given regarding a case where the interval for subcarriers to which a CAZAC sequence is mapped is assumed to be a two-subcarrier interval. However, the interval for subcarriers to which a CAZAC sequence is mapped is not restricted to a two-subcarrier interval. For example, in the case of the subcarrier interval (P=4), the radio transmission device 100 may generate a signal in which a Manchester coded OOK signal is repeated. Specifically, the radio transmission device 100 may map a ZC sequence having a sequence length of $N_{ZC}=3$ to a 4-MHz band at four-subcarrier intervals. Thus, the waveform of the time domain obtained after 128-point IFFT processing becomes a signal in which a ZC sequence having a length of 1.6 us is repeated for four periods. The Manchester coder 105 generates a repetition signal of the information symbol "0" by masking the second and fourth ZC sequences, and generates a repetition signal of the information symbol "1" by masking the first and third ZC sequences, from among ZC sequences for four periods, for example. Furthermore, the radio transmission device 100, by increasing the mask pattern, is also able to generate, in one go, a Manchester coded OOK signal for two symbols by combining any data without being restricted to repetition.

Modified Example 2 of Embodiment 1

ZC sequences generated by the sequence generator 102 have a different CM/PAPR depending on the sequence number. Thus, the radio transmission device 100 has the effect of being able to further reduce the power consumption of the radio reception device 500 (terminal) by generating a Manchester coded OOK signal using the sequence number having the lowest CM/PAPR. For example, as depicted in FIG. 13, a ZC sequence having a sequence length of 7 ($N_{ZC}=7$) has the lowest CM in the case where the sequence number "q=1 or $N_{ZC}-1$" is used. Even when $N_{ZC}=8$ to 97, the CM becomes the lowest in the case where the sequence number "q=1 or $N_{ZC}-1$" is similarly used. Thus, the radio transmission device 100 (sequence generator 102) may generate a Manchester coded OOK signal using a ZC sequence having the sequence number "q=1 or $N_{ZC}-1$". In this way, by restricting to a ZC sequence having the sequence number "q=1 or $N_{ZC}-1$", it is possible to further reduce the power consumption of the radio reception device 500 (terminal).

Embodiment 2

In the case where the transmission power of an end section within an ON signal of a Manchester coded OOK signal is high, due to the effect of inter-symbol interference (ISI) caused by multiple paths or filter responses, signal components of the high power region are superposed with an adjacent OFF signal region and become interference, and WUR performance deteriorates.

Furthermore, at the receiving side, decoding processing is carried out with CP components included in the Manchester coded OOK signal being removed. Therefore, in a case where an end section within an ON signal is a CP, the CP portion in which the transmission power is high is removed, and power efficiency declines.

Thus, in the present embodiment, a description will be given regarding a method for preventing a deterioration in WUR performance or a decline in power efficiency accompanying an increase/decrease in transmission power within the waveform of an ON signal within a Manchester coded OOK signal.

It should be noted that the radio reception device according to the present embodiment has a basic configuration that is common to the radio reception device 500 according to embodiment 1, and will therefore be described with reference to FIG. 9.

[Configuration of Radio Transmission Device]

Figure 14:
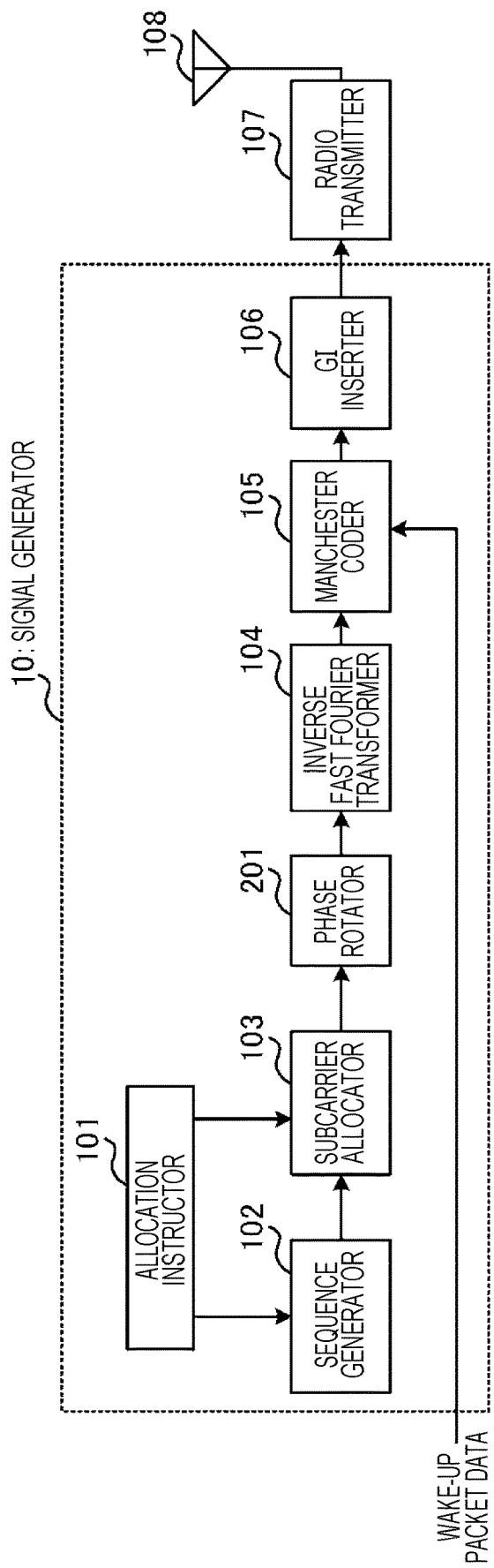
FIG. 14 is a block diagram depicting an example configuration of a radio transmission device according to embodiment 2.

FIG. 14 is a block diagram depicting the configuration of a radio transmission device 200 according to the present embodiment. It should be noted that, in FIG. 14, configurations that are the same as in embodiment 1 (FIG. 6) are denoted by the same reference numbers, and descriptions thereof have been omitted.

In the radio transmission device 200, a phase rotator 201 carries out a phase rotation on a signal that is input from the subcarrier allocator 103. Specifically, the phase rotator 201 carries out a phase rotation on a signal of the frequency domain in such a way that a power peak in the time waveform within the segment of the ON signal within a Manchester coded OOK signal generated in the Manchester coder 105 of a subsequent stage is arranged in the central portion within the segment of the ON signal. Then, the phase rotator 201 outputs the signal obtained after the phase rotation to the inverse fast Fourier transformer 104.

The operation of the phase rotator 201 will be described in detail hereinafter.

Here, the case where a ZC sequence is used as a sequence generated in the sequence generator 102 will be described.

Figure 15:
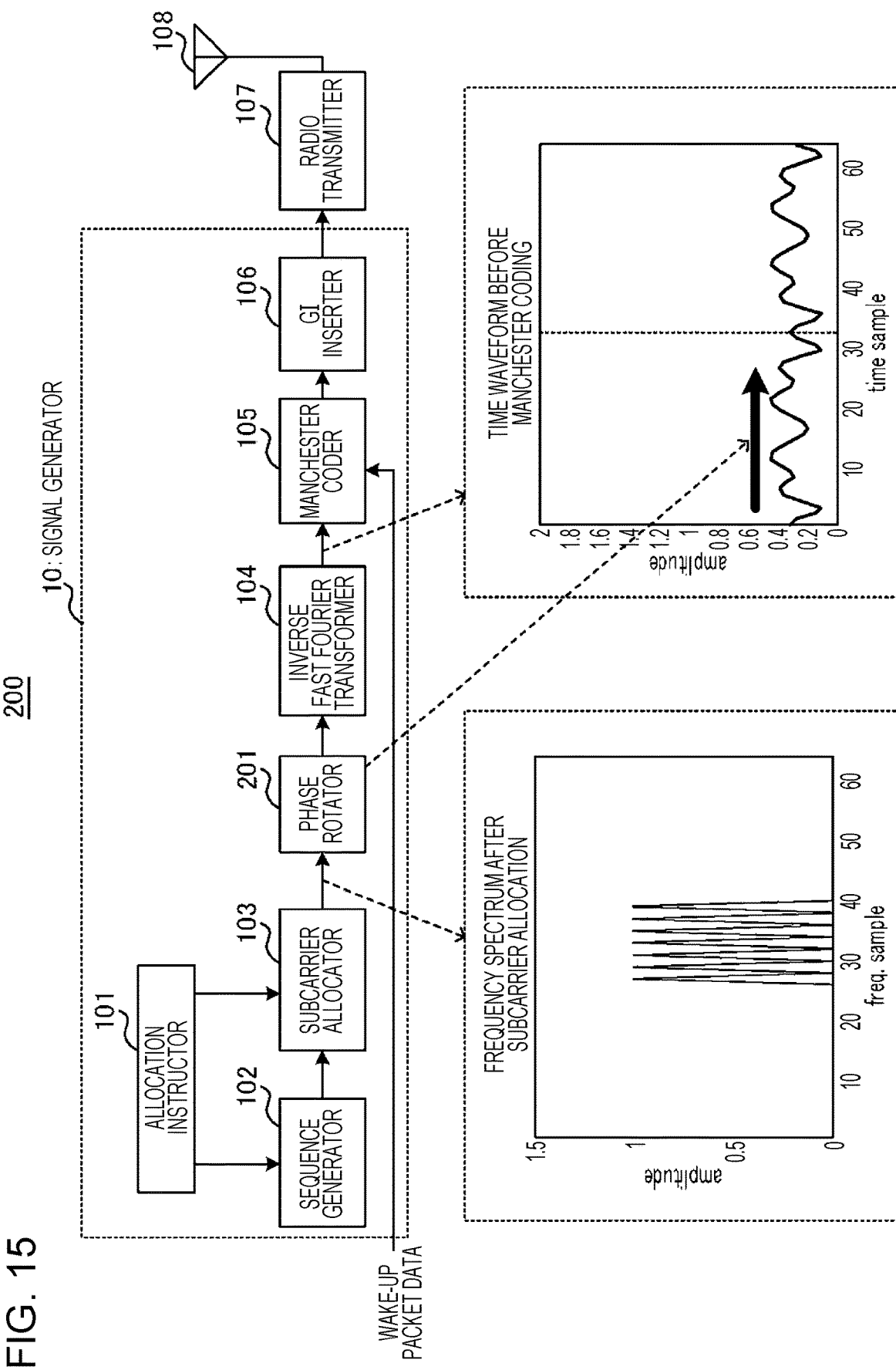
FIG. 15 is a drawing depicting an example of phase rotation processing according to embodiment 2.

FIG. 15 depicts a frequency spectrum and time waveform in the case where a ZC sequence having a sequence length $N_{ZC}=7$ and a sequence number q=1 is allocated at subcarrier intervals P=2 in the location of the subcarriers (M=13) of the allocated band.

As depicted in FIG. 15, although a fixed amplitude (1.0) is achieved at each subcarrier interval (P=2) in the frequency domain, due to the effect of over sampling, the time waveform obtained after IFFT is not fixed. Therefore, in a case where portions having a high transmission power are present at both end sections of the time waveform, due to the effect of inter-symbol interference (ISI) caused by multiple paths or filter responses, signal components of high power regions are superposed with OFF signal regions obtained after Manchester coding and become interference, and WUR performance deteriorates.

In response, in the radio transmission device 200, the phase rotator 201 carries out phase rotation on an output signal of the frequency domain that is input from the subcarrier allocator 103. Due to the properties of a Fourier transform, by carrying out a phase rotation on an output signal of the frequency domain, in the time domain, the time waveform can be cyclically shifted, as depicted in FIG. 15. In other words, the phase rotator 201 cyclically shifts the time waveform in such a way that components having high transmission power are not both end sections of the time waveform. By doing so, it is possible to reduce the deterioration in performance brought about by the effect of inter-symbol interference (ISI) caused by multiple paths or filter responses.

In this way, according to the present embodiment, it is possible to reduce the ISI that accompanies an increase/decrease in transmission power within the time waveform of an ON signal, and to improve WUR performance. Furthermore, it is also possible to improve power efficiency in a case where CPs are used.

Figure 16:
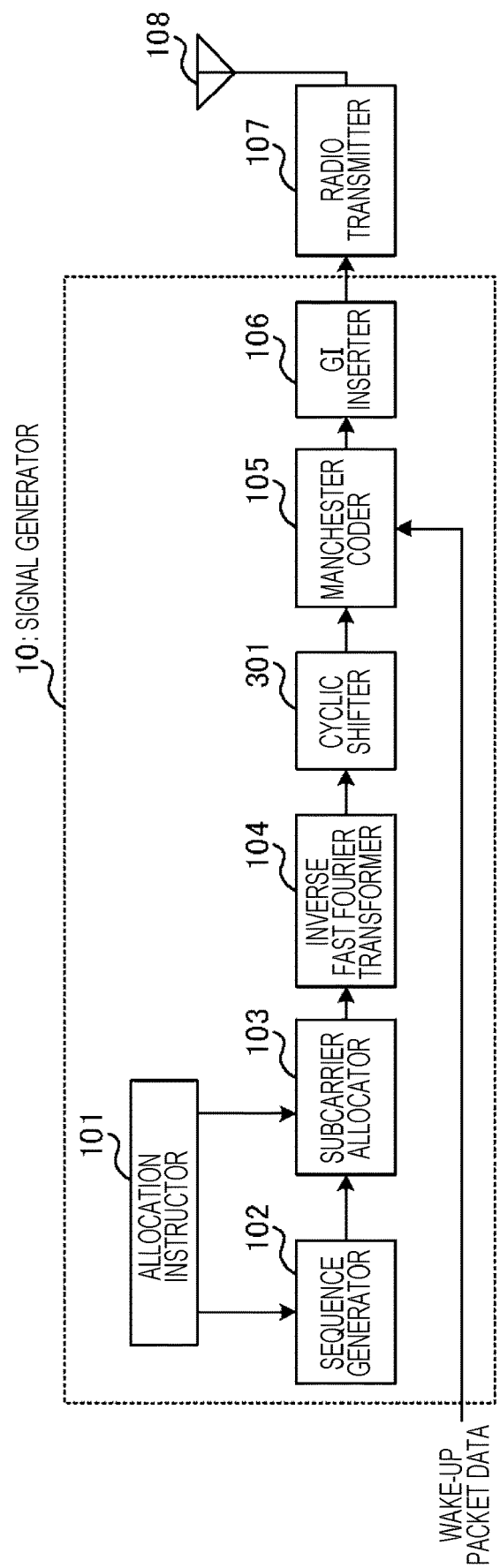
FIG. 16 is a block diagram depicting another example configuration of the radio transmission device according to embodiment 2.

It should be noted that, instead of the phase rotator 201 provided in the radio transmission device 200 depicted in FIG. 14, a cyclic shifter 301 that carries out a cyclic shift on a time domain signal that is output from the inverse fast Fourier transformer 104 may be provided, like the radio transmission device 300 depicted in FIG. 16. The cyclic shifter 301 carries out a cyclic shift on the time domain signal in such a way that the power peak in the time waveform within the segment of the ON signal within a Manchester coded OOK signal is arranged in the central portion within the segment of the ON signal. It is thereby possible to obtain a similar effect to when a phase rotation is carried out.

Furthermore, in a case where a ZC sequence is used, the phase rotation amount or cyclic shift amount for arranging the power peak in the time waveform within the segment of the ON signal in the central portion of the ON signal is dependent on the ZC sequence number q. Thus, the radio transmission devices 200 and 300 may alter the phase rotation amount or cyclic shift amount for each ZC sequence number. It is thereby possible to arrange the peak value for power in the time waveform in the central section in all sequence numbers, and it is therefore possible to reduce the deterioration in performance brought about by the effect of inter-symbol interference (ISI) caused by multiple paths or filter responses.

Modified Example of Embodiment 2

The sequence generated by the sequence generator 102 is not restricted to a ZC sequence, and may be a sequence having fixed subcarrier coefficients. For example, a description will be given regarding an example of the allocation of coefficients to 13 subcarriers, in which fixed coefficients of seven samples (coefficients with which all samples have an amplitude of 1.0) are allocated at two-subcarrier intervals (see NPL 2), as depicted in FIG. 2.

Figure 17:
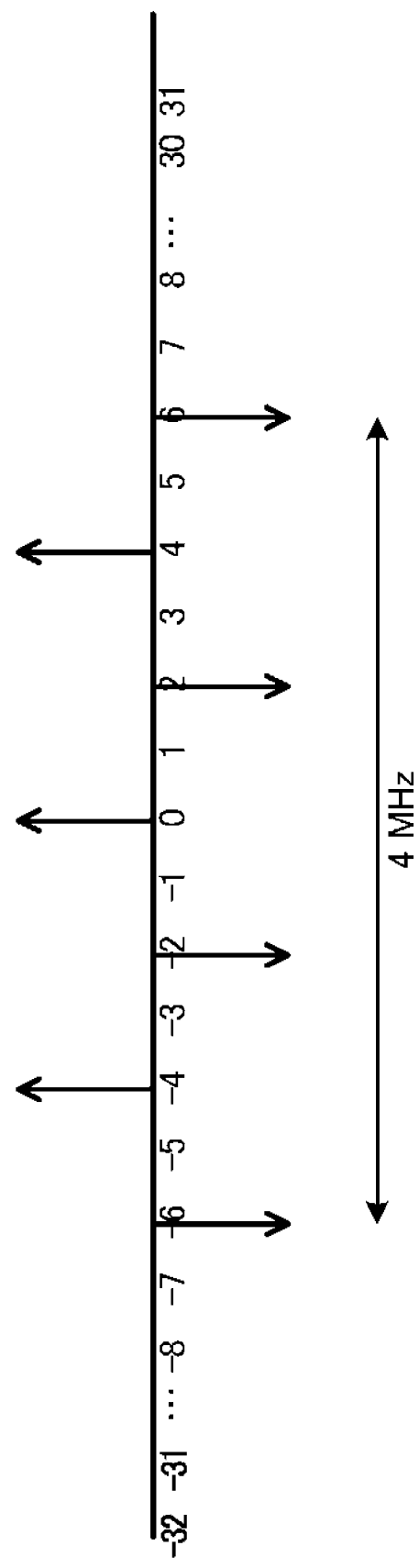
FIG. 17 is a drawing depicting an example of allocating an OFDM subcarrier according to a modified example of embodiment 2.
Figure 18:
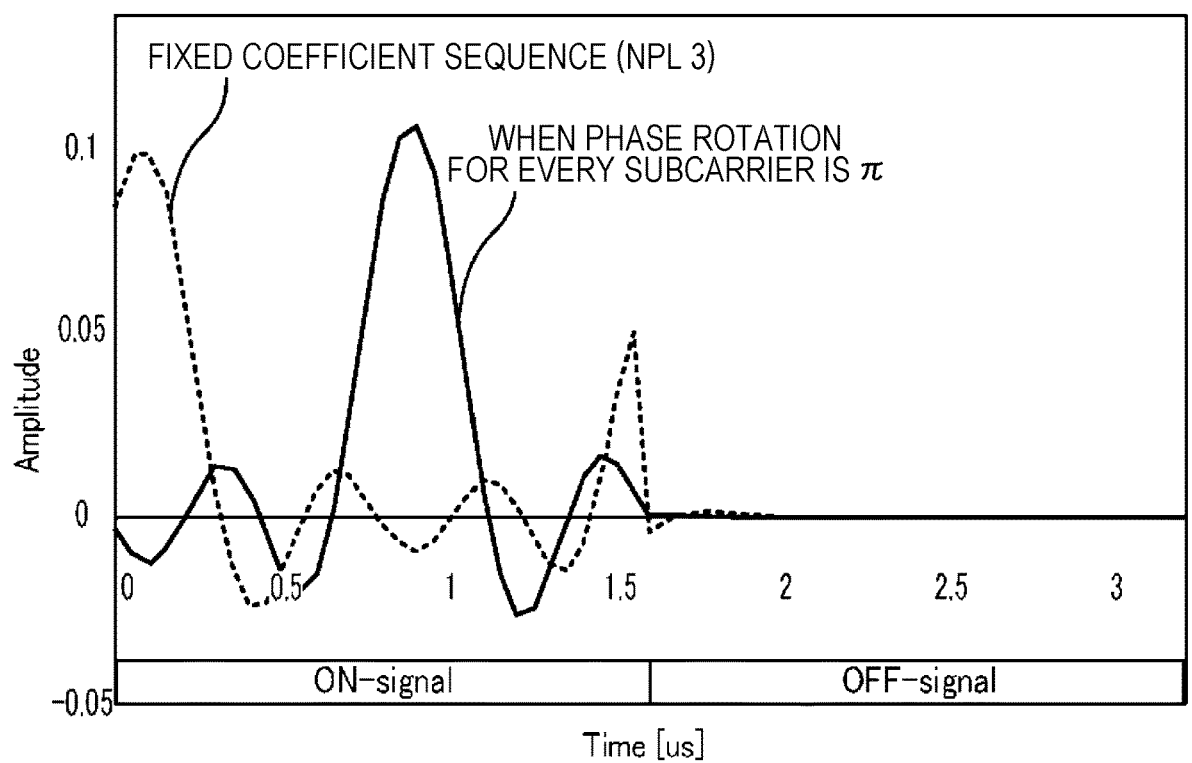
FIG. 18 is a drawing depicting an example of a time domain signal of a ZC sequence according to a modified example of embodiment 2.

FIG. 17 depicts an example of a sequence in the case where the phase rotation amount for each subcarrier is taken as $\pi$. In the case where the phase rotation amount is $\pi$, the values of the subcarrier coefficients become values that are sign-inverted as in −1, +1, −1, +1, −1, +1, −1 every two samples, as depicted in FIG. 17. Due to the phase rotation depicted in FIG. 17, it is possible to arrange the power peak in the time waveform within the ON signal in the central section of the ON signal, as depicted in FIG. 18. Coefficients that are values which are sign-inverted every two samples can be made to correspond to the signal points of a subcarrier modulation such as BPSK in IEEE 802.11 OFDM PHY, and therefore a modulator of OFDM PHY can be used as it is to generate a WUR signal. Thus, there is the effect of it being possible to additionally simplify the configuration of the radio transmission devices 200 and 300.

It should be noted that the phase rotation amount for each subcarrier is not restricted to $\pi$, and it is sufficient for the phase rotation amount to be a value with which a power peak in the time waveform within the ON signal is not arranged at both end sections of the ON signal.

Furthermore, the values of the aforementioned subcarrier coefficients are relative values, and fixed normalization coefficients can be multiplied in order to express a desired transmission power. Furthermore, as a modification having equivalent spectrum and CM/PAPR characteristics, values obtained by applying a fixed phase rotation to all coefficients may be used as subcarrier coefficients. These are not restricted to the present embodiment, and are applicable to all subcarrier coefficients in the present disclosure.

Embodiment 3

In the present embodiment, a description will be given regarding a method for generating an OOK waveform that has flat characteristics in the frequency domain and low CM/PAPR characteristics, even in a case where coefficients are allocated to all 13 subcarriers to which a wake-up packet is allocated (that is, in a case where coefficients are allocated at one-subcarrier intervals), using a ZC sequence.

It should be noted that the radio reception device according to the present embodiment has a basic configuration that is common to the radio reception device 500 according to embodiment 1, and will therefore be described with reference to FIG. 9.

Figure 19A:
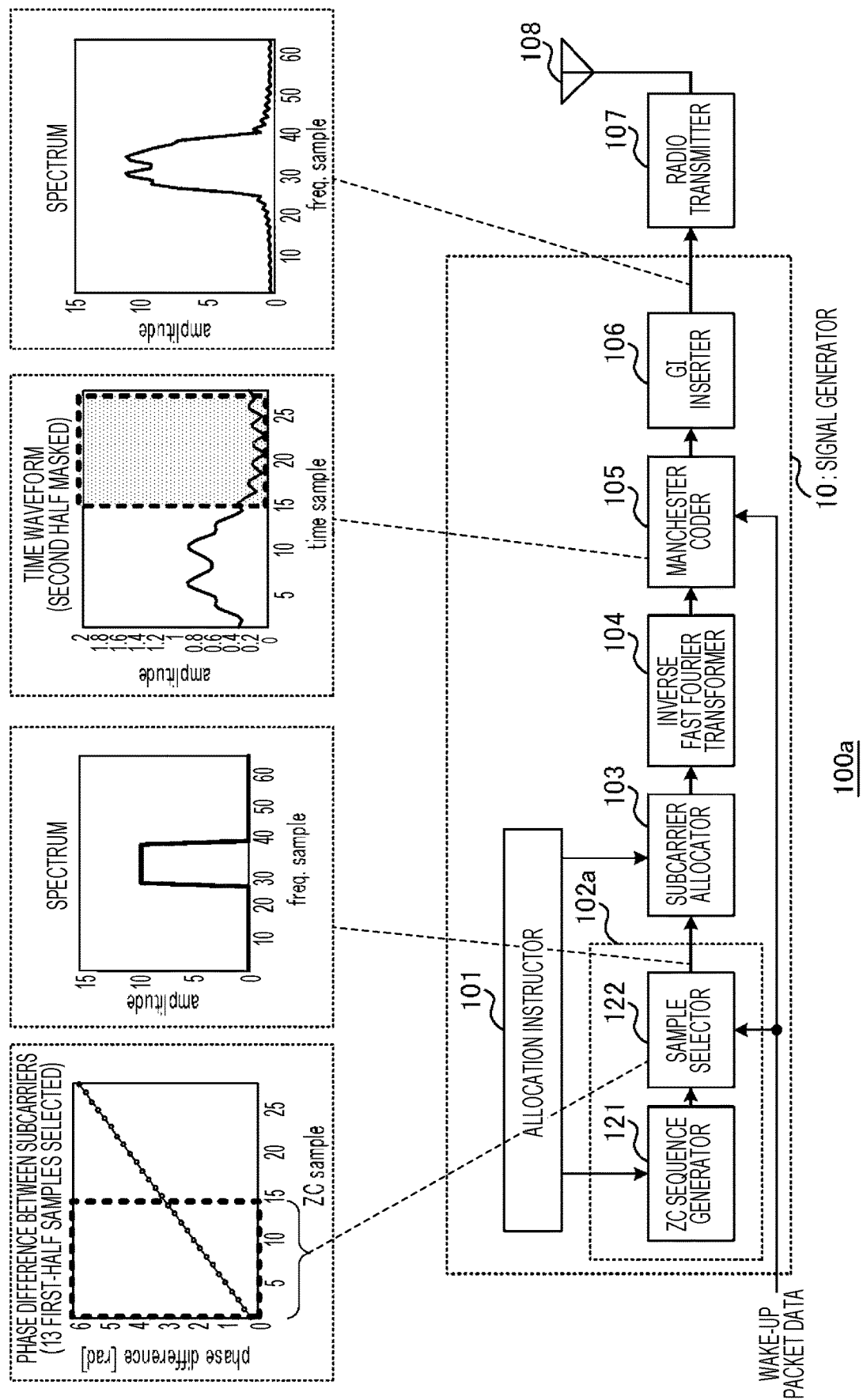
FIG. 19A is a drawing depicting an example configuration and an example operation of a radio transmission device according to embodiment 3.

FIGS. 19A and 19B are drawings depicting an example of the configuration and operation of a radio transmission device 100a according to the present embodiment. It should be noted that, in the radio transmission device 100a depicted in FIGS. 19A and 19B, configurations that are the same as in embodiment 1 (FIG. 6) are denoted by the same reference numbers, and explanations thereof have been omitted. Specifically, in the radio transmission device 100a, the operation of a sequence generator 102a is different from embodiment 1.

The sequence generator 102a in FIGS. 19A and 19B adopts a configuration provided with a ZC sequence generator 121 and a sample selector 122.

It should be noted that FIGS. 19A and 19B depict an example in which wake-up packet data is allocated to all 13 subcarriers. In other words, in FIGS. 19A and 19B, the sequence generator 102a generates a sequence for 13 samples respectively allocated to 13 subcarriers.

Furthermore, hereinafter, a phase difference between adjacent samples, from among a plurality of samples constituting a ZC sequence generated in the sequence generator 102a, is represented by "mod $2\pi$" (modulo operation of $2\pi$). In other words, the phase difference between adjacent samples of a ZC sequence is a value that is greater than or equal to 0 and less than $2\pi$.

In this case, the radio transmission device 100a uses a ZC sequence with which the phase difference between adjacent samples monotonically increases together with an increase in the sample (sample number), as depicted in FIGS. 19A and 19B. For example, in FIGS. 19A and 19B, in a ZC sequence having sequence number q=1, the phase difference between adjacent samples monotonically increases in the 0 to 2π segment, from sample m=0 to m=28.

Specifically, as depicted in FIG. 19A, the radio transmission device 100a generates a first time waveform (corresponding to the information symbol "0", for example), using 13 samples in which the phase difference monotonically increases, as subcarrier coefficients in a segment in which the phase difference between ZC sequence samples is 0 to π.

On the other hand, as depicted in FIG. 19B, the radio transmission device 100a generates a second time waveform (corresponding to the information symbol "1", for example), using 13 samples in which the phase difference monotonically increases, as subcarrier coefficients in a segment in which the phase difference between ZC sequence samples is π to 2π.

In this way, in a case where subcarriers have allocated thereto samples in which the phase differences of the segments of the first half segment (0 to π) or the second half segment (π to 2π) monotonically increase from among segments of phase differences between samples, due to the properties of a Fourier transform, a time waveform in which signal components are concentrated in the first half or the second half is obtained as a time domain signal waveform after IFFT processing. Specifically, in FIG. 19A, a first time waveform in which signal components are concentrated in the first half is obtained, and in FIG. 19B, a second time waveform in which signal components are concentrated in the second half is obtained. That is, in FIG. 19A, a Manchester coded OOK signal in which the first half segment of the time waveform serves as an ON signal and the second half segment serves as an OFF signal is generated. Similarly, in FIG. 19B, a Manchester coded OOK signal in which the first half segment of the time waveform serves as an OFF signal and the second half segment serves as an ON signal is generated.

Thus, two types of time waveforms obtained in this way can be used as Manchester coded OOK signals without having to carry out mask processing in the Manchester coder 105. It should be noted that mask processing may be carried out to shape the time waveform in the Manchester coder 105, and even in this case, it is possible to reduce spectral disturbance caused by mask processing.

More specifically, the ZC sequence generator 121 of the sequence generator 102a generates a ZC sequence having a sequence length that is two or more times the number of carriers used, in order to select samples that satisfy the aforementioned sequence properties. In FIGS. 19A and 19B, the ZC sequence generator 121 generates a ZC sequence having a sequence length of 29 which is two or more times the number of carriers used of 13. At such time, as mentioned above, the ZC sequence generator 121 may generate a ZC sequence having the sequence number "q=1 or $N_{ZC}-1$" with which the CM/PAPR is the lowest.

Furthermore, the sample selector 122 of the sequence generator 102a selects 13 samples in which the phase difference monotonically increases, from the first half portion (m=0 to 13 in the first half in FIG. 19A) or the second half portion (m=14 to 28 in the second half in FIG. 19B) of the ZC sequence that is input from the ZC sequence generator 121, in accordance with wake-up packet data (information symbol "0" or "1") that is input, and generates subcarrier coefficients that are allocated to all subcarriers (13 subcarriers) in a determined range in the band center.

In FIGS. 19A and 19B, a description has been given regarding a ZC sequence in which the phase difference between samples monotonically increases (sequence number q=1, for example); however, it should be noted that the same is also true for a ZC sequence in which the phase difference between samples monotonically decreases (sequence number $q=N_{ZC}-1$, for example).

Furthermore, in FIGS. 19A and 19B, a description has been given regarding the case where a ZC sequence is generated having a sequence length $N_{ZC}=29$ which is close to two times the number of subcarriers (13 subcarriers) to which wake-up packet data is allocated. However, the ZC sequence generated by the ZC sequence generator 121 is not restricted to a ZC sequence having a sequence length that is close to two times the number of subcarriers used. The ZC sequence generator 121 may use a ZC sequence having a sequence length that is even longer than a sequence length that is close to two times the number of subcarriers used, provided that the ZC sequence is a ZC sequence with which the phase difference monotonically increases (or monotonically decreases).

In a case where the number of samples in the first half or second half of a ZC sequence is greater than the number of subcarriers to which wake-up packet data is allocated, the sample selector 122 may select a portion (a range corresponding to the number of subcarriers used) from among the samples in the first half or second half making up the ZC sequence. As depicted in FIGS. 19A and 19B, extracting 13 first half samples or 13 second half samples of the ZC sequence is carried out by separating and extracting a segment having a phase difference from 0 to π or a segment having a phase difference from π to 2π. Thus, due to the properties of a Fourier transform, a signal waveform in which power (amplitude) is concentrated in the first half or second half is obtained as a time waveform, as depicted in FIGS. 19A and 19B.

Next, the operation of the Manchester coder 105 will be described in detail. Hereinafter, Manchester coding methods 1, 2, and 3 according to the present embodiment will each be described.

<Manchester Coding Method 1>

The Manchester coder 105 generates an OOK information symbol "0" or an OOK information symbol "1" by carrying out Manchester coding (masking out the first half or second half) on a time waveform obtained after IFFT, in a manner similar to embodiment 1.

Thus, the transmission signal power of the OFF signal becomes 0, and the power difference between the ON signal and the OFF signal according to reception processing therefore increases, and the signal detection precision at the ON-OFF determiner 506 of the radio reception device 500 can be improved.

<Manchester Coding Method 2>

The Manchester coder 105 generates an OOK information symbol "0" or an OOK information symbol "1" by, with respect to the time waveform obtained after IFFT, multiplying a portion of the OFF signal by a window function such as an RRC (root-raised cosine filter).

Thus, the continuity of the time waveform is maintained, interference to outside of the band is reduced, and the effect of frequency flatness within the band being improved is obtained. As the simplest example of a window function, the Manchester coder 105 may multiply subcarriers of the upper end and lower end to which samples of an ZC sequence are allocated in the frequency domain, by a determined coefficient that is less than 1. As the determined coefficient, 0.5 or the square root of 0.5 may be used. In order to obtain a satisfactory window function effect, it is preferable that the determined coefficient be greater than or equal to 0.5 and less than or equal to the square root of 0.5.

<Manchester Coding Method 3>

The Manchester coder 105 generates an OOK information symbol "0" or an OOK information symbol "1" without carrying out masking out or multiplication by a window function, with respect to the time waveform obtained after IFFT.

As mentioned above, with the sequence generation method according to the present embodiment, a signal waveform in which power is concentrated in the first half or second half of the time waveform is obtained. Therefore, even if masking out or multiplication by a window function is not carried out, an ON signal and an OFF signal can be obtained, and a similar effect to Manchester coding can be obtained.

Thus, the frequency characteristics (frequency flatness) of a generated ZC sequence are maintained, and the effect of it being possible to reduce interference to outside of the band is obtained.

Hereinabove, Manchester coding methods 1, 2, and 3 have been described.

It should be noted that the Manchester coder 105 may switch between Manchester coding methods 1, 2, and 3 in accordance with the allocation situation of other signals in resources peripheral to the resource to which a WUR signal is allocated. For example, in a case where no signals are allocated in peripheral resources (in a case where the effect of interference to outside of the band is low), WUR signal reception performance can be improved by using Manchester coding method 1. Furthermore, in a case where signals are allocated in peripheral resources (in a case where the effect of interference to outside of the band is large), interference to outside of the band can be reduced by using Manchester coding method 2 or 3.

Furthermore, Manchester coding method 2 is not restricted to the present embodiment, and may be used instead of masking out in embodiments 1 and 2. Thus, spectral disturbance can be reduced more than with masking out, and therefore interference to outside of the band can be reduced, and frequency flatness within the band can be improved.

In this way, in the present embodiment, in a case where coefficients are set to all subcarriers to which wake-up packet data is allocated (in the case of a one-subcarrier interval), the radio transmission device 100a uses a ZC sequence with which the phase difference between adjacent samples from among a plurality of samples monotonically increases or monotonically decreases together with an increase in the sample number m. Specifically, in a case where the phase difference is represented by segments from 0 to $2\pi$ (in a case where the phase difference is represented by "mod $2\pi$"), the radio transmission device 100a generates a Manchester coded OOK signal having a time waveform corresponding to the information symbol "0" by mapping samples within the segment in which the phase difference is 0 to $\pi$ to subcarriers respectively, and generates a Manchester coded OOK signal having a time waveform corresponding to the information symbol "1" by mapping samples within the segment in which the phase difference is $\pi$ to $2\pi$ to subcarriers respectively.

Thus, according to the present embodiment, it is possible to generate an OOK waveform having flat characteristics and low CM/PAPR characteristics in the frequency domain, even in a case where coefficients are allocated to all 13 subcarriers to which a wake-up packet is allocated, using a ZC sequence.

An example in which a ZC sequence is used has been described in the present embodiment; however, it should be noted that the subcarrier coefficients that are set in the present embodiment are not restricted to a ZC sequence and can be similarly applied also to a sequence having the aforementioned phase difference characteristics. By using a sequence having the aforementioned phase difference characteristics, the radio transmission device 100a is able to generate an OOK waveform having flat characteristics and low CM/PAPR characteristics in the frequency domain.

Furthermore, the phase difference between samples of a ZC sequence may not be a strict monotonic increase (or monotonic decrease), and a substantial monotonic increase (or monotonic decrease) is sufficient, such as a monotonic increase (monotonic decrease) in the majority of segments (preferably 80% or more segments) with some segments being excluded.

Hereinafter, as a special example, a description will be given regarding a case where the phase difference between samples is fixed, in other words, the amount of increase of a monotonic increase is taken as 0.

The radio transmission device 100a generates a first waveform (corresponding to the information symbol "0", for example) using, as subcarrier coefficients, samples in which the phase difference between samples is a fixed value within the segment from 0 to $\pi$. Preferably, $\pi/2$ may be used as the fixed value.

Furthermore, the radio transmission device 100a generates a second waveform (corresponding to the information symbol "1", for example) using, as subcarrier coefficients, samples in which the phase difference between samples becomes a fixed value within the segment from $\pi$ to $2\pi$. Preferably, $(3/2)\pi$ may be used as the fixed value. Alternatively, equivalently, $-\pi/2$ may be used as the fixed value.

As a specific example, the radio transmission device 100a may generate a first waveform with a sample sequence $[-1, -j, +1, +j]$ in which the phase difference is $\pi/2$ being repeated and allocated to subcarriers as subcarrier coefficients, and may generate a second waveform with a sample sequence $[-1, j, +1, -j]$ in which the phase difference is $-\pi/2$ being repeated and allocated to subcarriers as subcarrier coefficients, where j is an imaginary unit. Alternatively, the radio transmission device 100a may use a sample sequence in which the aforementioned samples are subjected to phase rotation of a fixed amount ($\pi/4$, for example).

According to the aforementioned specific example, subcarrier coefficients can be made to correspond to the signal points of a subcarrier modulation such as QPSK or QAM in IEEE 802.11 OFDM PHY, and therefore an OFDM PHY modulator can be used as it is to generate a WUR signal. Thus, there is the effect of it being possible to additionally simplify the configuration of the radio transmission device 100a.

Embodiment 4

In the present embodiment, it is assumed that correlation detection is carried out in the radio reception device, and a description is given regarding a method for transmitting a WUR signal using any ZC sequence of a plurality of sequence numbers or cyclic shifts (CS) in the radio transmission device.

[Configuration of Radio Transmission Device]

Figure 20:
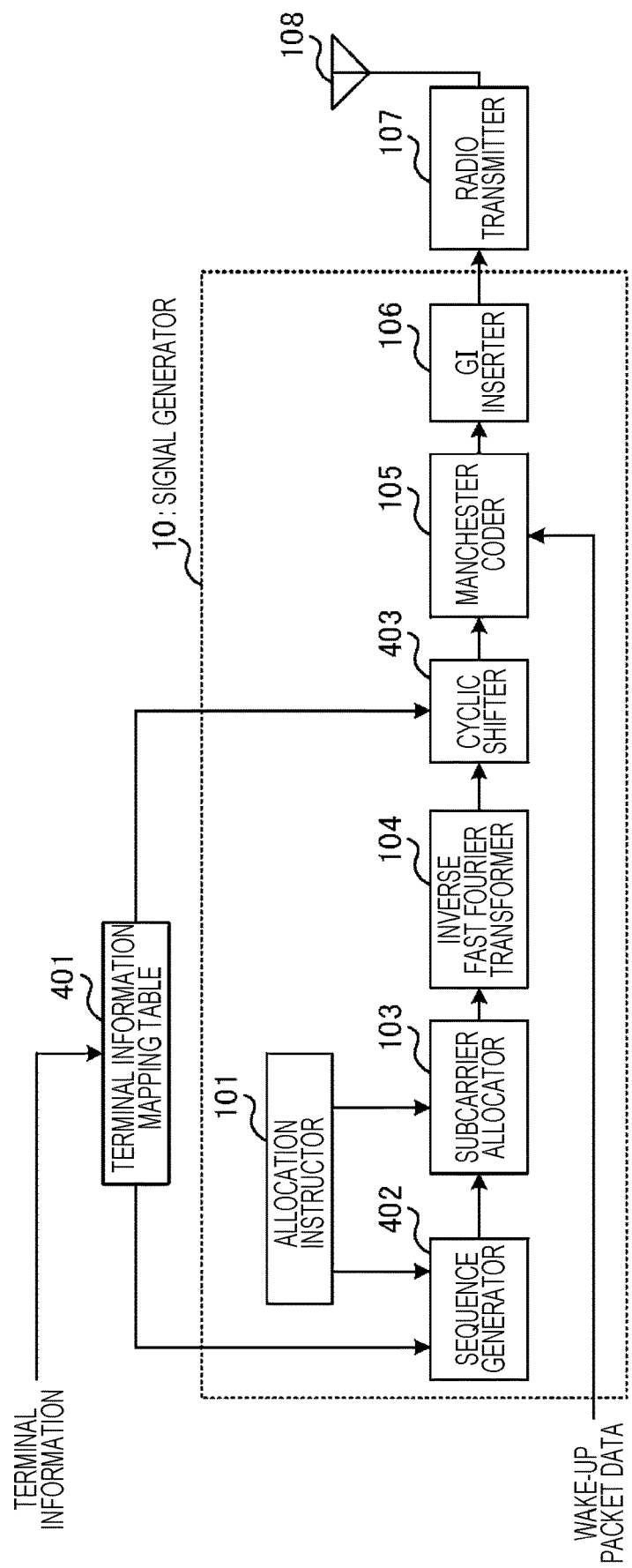
FIG. 20 is a drawing depicting an example configuration of a radio transmission device according to embodiment 4.

FIG. 20 is a block diagram depicting an example configuration of a radio transmission device 400 according to the present embodiment. It should be noted that, in FIG. 20, configurations that are the same as in embodiment 1 (FIG. 6) or embodiment 2 (FIG. 16) are denoted by the same reference numbers, and descriptions thereof have been omitted.

In the radio transmission device 400, a terminal information mapping table 401 has associated therein terminal information (for example, BSS-IDs, transmission buffer sizes, or the like) which is parameter information that is notified to a terminal (a radio reception device 600 described later), and a plurality of ZC sequences (different ZC sequence numbers or different cyclic shift amounts). As an example, FIG. 21 depicts associations between BSS-IDs and ZC sequences, and FIG. 22 depicts associations between transmission buffer sizes and cyclic shift amounts of ZC sequences.

It should be noted that the association between terminal information and ZC sequence information (ZC sequence numbers or cyclic shift amounts) is not restricted to the examples depicted in FIGS. 21 and 22. Furthermore, the terminal information is also not restricted to the examples depicted in FIGS. 21 and 22 (BSS-IDs and transmission buffer sizes), and may be parameter information that is to be exchanged between a radio transmission device 500 (AP) and a radio reception device 600 (terminal) such as other information (WUR schedule information (duty cycle or period), for example).

A sequence generator 402 generates a ZC sequence on the basis of a ZC sequence number decided in the terminal information mapping table 401, and a cyclic shifter 403 carries out a cyclic shift for the signal obtained after IFFT in a manner similar to that in embodiment 2 (see FIG. 16) on the basis of a cyclic shift amount decided in the terminal information mapping table 401.

[Configuration of Wireless Reception Device]

Figure 23:
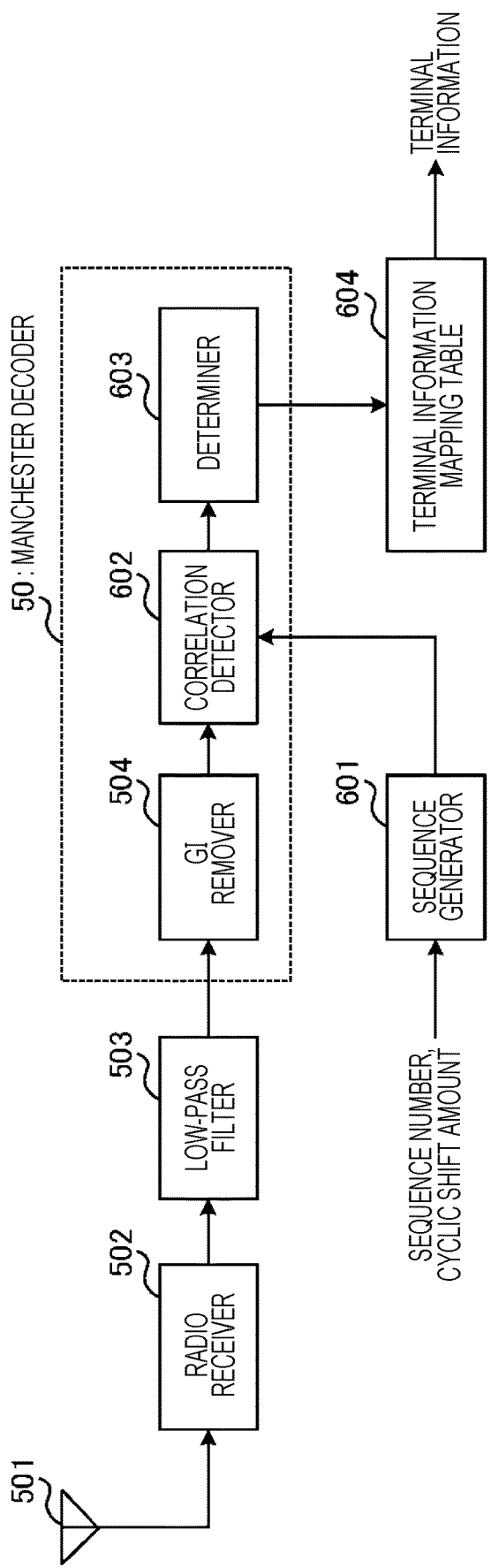
FIG. 23 is a drawing depicting an example configuration of a radio reception device according to embodiment 4.

FIG. 23 is a block diagram depicting an example configuration of the radio reception device 600 according to the present embodiment. It should be noted that, in FIG. 23, configurations that are the same as in embodiment 1 (FIG. 9) are denoted by the same reference numbers, and descriptions thereof have been omitted.

In the radio reception device 600, a sequence generator 601 generates ZC sequences that may be used to generate wake-up packet data (a Manchester coded OOK signal) by the radio transmission device 500. Specifically, the sequence generator 601 selects a plurality of ZC sequence numbers or a plurality of cyclic shift amounts, and generates a plurality of ZC sequences respectively corresponding to the selected ZC sequence numbers or cyclic shift amounts.

A correlation detector 602 detects correlations with the reception signal obtained after GI removal, which is input from the GI remover 504, using the plurality of ZC sequences generated by the sequence generator 601, and outputs a plurality of correlation values to a determiner 603.

The determiner 603 compares the plurality of correlation values (correlation values corresponding to the plurality of sequence numbers/cyclic shift amounts) that are input from the correlation detector 602, determines which sequence number or which cyclic shift amount is being used as wake-up packet data, and outputs the determination result to a terminal information mapping table 604.

Similar to the terminal information mapping table 401, the terminal information mapping table 604 has associated therein terminal information and ZC sequence information (ZC sequence numbers or cyclic shift amounts) (see FIG. 21 or 22, for example). The terminal information mapping table 604 reads and outputs terminal information (BSS-IDs, transmission buffer sizes, or the like) associated with the sequence number or cyclic shift amount determined in the determiner 603. For example, in the case of the terminal information mapping example depicted in FIG. 21, the terminal information mapping table 604 reads the BSS-ID associated with the sequence number that has been determined. Furthermore, in the case of the terminal information mapping example depicted in FIG. 22, the terminal information mapping table 604 reads the transmission buffer size associated with the cyclic shift amount that has been determined.

Next, specific examples 4-1, 4-2, and 4-3 of the mapping between terminal information and ZC sequences will each be described.

Specific Example 4-1

In the terminal information mapping table 401 of the radio transmission device 400, the ZC sequence numbers are set so as to be different between adjacent BSSs.

For example, as depicted in FIG. 21, a plurality of ZC sequences having different ZC sequence numbers q are respectively associated with different BSSs (BSS-IDs).

The radio reception device 600 can obtain a BSS-ID from the ZC sequence number determined by the determiner 603 and the terminal information mapping (see FIG. 21, for example) in the terminal information mapping table 604.

Cross-correlation among ZC sequences having different ZC sequence numbers is low (ideally $1/\sqrt{N_{ZC}}$), and therefore there is the effect that interference from an adjacent BSS can be reduced.

Specific Example 4-2

As depicted in FIG. 24, in the terminal information mapping table 401 of the radio transmission device 400, the cyclic shift amount selected is different for each terminal (radio reception device 600) to which a wake-up packet is to be transmitted. In other words, a plurality of ZC sequences are respectively associated with different terminals.

ZC sequences having different cyclic shift amounts are orthogonal at the receiving side, and therefore each terminal (radio reception device 600) is able to extract signal components addressed thereto. In other words, the radio transmission device 400 is able to carry out CDM multiplexing on signals intended for a plurality of terminals.

Thus, there is the effect of it being possible to increase the number of terminals accommodated.

Specific Example 4-3

As depicted in FIG. 25, a plurality of ZC sequences (may be ZC sequence numbers q or cyclic shift amounts) are uniquely associated with determined terminal information (transmission buffer sizes, for example).

The radio transmission device 400 generates a Manchester coded OOK signal using the ZC sequence (ZC sequence number q) associated with terminal information notified to a terminal (radio reception device 600) to which wake-up packet data is transmitted. In other words, the radio transmission device 400 implicitly notifies the radio reception device 600 of another parameter (here, the transmission buffer size) using wake-up packet data.

Furthermore, a plurality of sequence numbers may be taken as $q=X$ and $q=N_{ZC}-X$ which have a complex conjugate relationship. It is thereby possible to simplify reception processing. The value of X may be $X=1$ (in other words, $q=1$ or $N_{ZC}-1$) which has low CM/PAPR characteristics, as mentioned above.

The radio transmission device 400 specifies terminal information (here, the transmission buffer size) associated with a ZC sequence (ZC sequence number q) used for the received wake-up packet data.

In this way, according to specific example 4-3, terminal information can be notified using a Manchester coded OOK signal without new signaling information being added.

Hereinabove, specific examples 4-1, 4-2, and 4-3 have been described.

It should be noted that, in the present embodiment, although a case where Manchester coding is used has been described, the present disclosure can also be applied to generate an OOK signal waveform using OFDM modulation in a case where Manchester coding is not carried out. For example, a case where an ON signal and an OFF signal are allocated 1-to-1 to each information symbol "0" and "1", a case where a combination of ON/OFF signals is allocated to each information symbol "0" and "1", or the like is also included.

Furthermore, the present embodiment may be combined with embodiments 1 to 3.

Furthermore, in FIG. 20, a case where the radio transmission device 400 is provided with the cyclic shifter 403 has been described; however, the radio transmission device 400 may have a configuration that is not provided with a cyclic shifter, similar to embodiment 1 (FIG. 6). In this case, associations between terminal information and ZC sequence numbers are decided in the terminal information mapping table 401.

Furthermore, in the present embodiment, a case where BSS-IDs and ZC sequences are associated has been described as an example; however, the parameter associated with a ZC sequence is not restricted to a BSS-ID and may be an AP or cell group, for example.

Embodiments of the present disclosure have been described hereinabove.

It should be noted that, in the aforementioned embodiments, a case where a ZC sequence having a sequence length of 7 (N=7) is applied to 13 (M=13) subcarriers (corresponding to a 4.06-MHz bandwidth) has been described (in other words, a ZC sequence is mapped to 7 subcarriers) (where M is an integer that is greater than or equal to 3 and N is an integer that is greater than or equal to 2). However, similarly, in a case where a ZC sequence is allocated to a number M of subcarriers other than 13, a ZC sequence having a sequence length of (M+1)/2 (M: odd number) or M/2 (M: even number) may be applied.

Furthermore, instead of using sample values of ZC sequences represented by complex numbers, as they are as subcarrier coefficients, they may be mapped to a QAM signal space used in IEEE 802.11 OFDM PHY, for example, and approximated at signal points making up a constellation. Thus, an OFDM PHY modulator can also be used to generate a WUP signal, and the configuration of the radio transmission device can be simplified.

Furthermore, the present disclosure is not restricted to WUR, and can also be applied to other radio communication systems such as ultra-low power radio communication.

Furthermore, in the aforementioned embodiments, a case where a ZC sequence is used as a CAZAC sequence has been described; however, the present disclosure is not restricted to a ZC sequence, and another sequence may be used.

It is possible for the present disclosure to be realized by means of software, hardware, or software in cooperation with hardware. Each functional block used in the description of the aforementioned embodiments may be partially or entirely realized as an LSI, which is an integrated circuit, and each process described in the aforementioned embodiments may be partially or entirely controlled by one LSI or a combination of LSIs. The LSIs may be configured from individual chips, or may be configured from one chip so as to include some or all of the functional blocks. The LSIs may be provided with a data input and output. The LSIs are also referred to as ICs, system LSIs, super LSIs, or ultra LSIs depending on differences in the degree of integration. The circuit integration technique is not limited to an LSI, and may be realized using a dedicated circuit, a general-purpose processor, or a dedicated processor. Furthermore, after an LSI has been manufactured, an FPGA (field-programmable gate array) that can be programmed, or a reconfigurable processor with which the connections and settings of circuit cells within the LSI can be reconfigured, may be used. The present disclosure may be realized as digital processing or analog processing. In addition, if circuit integration technology that replaces LSI appears as a result of another technology that is an advancement in semiconductor technology or is derived therefrom, naturally, the other technology may be used to carry out the integration of functional blocks. Biotechnology applications and the like are also a possibility.

A radio transmission device of the present disclosure is provided with: a signal generation circuit that generates an OOK (on-off keying) modulation signal by mapping a CAZAC (constant amplitude zero auto-correlation) sequence to N subcarriers (N being an integer that is greater than or equal to 2) arranged at a determined interval among M subcarriers (M being an integer that is greater than or equal to 3) that are adjacent in the frequency domain, carrying out inverse fast Fourier transform (IFFT) processing on the mapped CAZAC sequence, and carrying out Manchester coding on a time domain signal generated by the IFFT processing; and a transmitter that transmits the OOK modulation signal.

In the radio transmission device of the present disclosure, the determined interval is a two-subcarrier interval, and the signal generation circuit generates the OOK modulation signal by masking out either one of a first half segment and a second half segment of the time domain signal, in the Manchester coding.

The CAZAC sequence is one of a plurality of ZC (Zadoff-Chu) sequences having a sequence length $N_{ZC}$, M is a number of subcarriers included in a bandwidth in which the OOK modulation signal is transmitted, and the sequence length $N_{ZC}$ is the smallest prime number that is greater than or equal to a value obtained by dividing M by the determined interval.

In the radio transmission device of the present disclosure, the CAZAC sequence is one of a plurality of ZC (Zadoff-Chu) sequences having a sequence length $N_{ZC}$, and the signal generation circuit generates the OOK modulation signal using a ZC sequence having a sequence number of 1 or $N_{ZC}-1$ from among the plurality of ZC sequences.

In the radio transmission device of the present disclosure, the signal generation circuit, in addition, carries out a phase rotation with respect to the mapped CAZAC sequence in such a way that a power peak in a time waveform within an ON segment within the OOK modulation signal is arranged in a central portion within the ON segment.

In the radio transmission device of the present disclosure, the signal generation circuit, in addition, carries out a cyclic shift with respect to the time waveform in such a way that a power peak in a time waveform within an ON segment within the OOK modulation signal is arranged in a central portion within the ON segment.

In the radio transmission device of the present disclosure, the determined interval is a one-subcarrier interval, the CAZAC sequence is a ZC (Zadoff-Chu) sequence, in which the phase difference between adjacent samples from among a plurality of samples constituting the ZC sequence monotonically increases or monotonically decreases together with an increase in the sample number, and the signal generation circuit, in a case where the phase difference is represented by segments from 0 to $2\pi$, generates the OOK modulation signal having a first time waveform by mapping a plurality of samples in which the phase difference monotonically increases or monotonically decreases, to the subcarriers respectively, in a segment in which the phase difference is 0 to $\pi$, and generates the OOK modulation signal having a second time waveform in which an ON signal and an OFF signal are inverted with respect to the first time waveform, by mapping a plurality of samples in which the phase difference monotonically increases or monotonically decreases, to the subcarriers respectively, in a segment in which the phase difference is $\pi$ to $2\pi$.

In the radio transmission device of the present disclosure, the signal generation circuit generates the OOK modulation signal using one CAZAC sequence from among a plurality of CAZAC sequences.

In the radio transmission device of the present disclosure, the plurality of CAZAC sequences are a plurality of ZC (Zadoff-Chu) sequences in which a sequence number or a cyclic shift amount is different, and the plurality of ZC sequences are respectively associated with different groups.

In the radio transmission device of the present disclosure, the plurality of CAZAC sequences are a plurality of ZC (Zadoff-Chu) sequences in which a sequence number or a cyclic shift amount is different, and the plurality of ZC sequences are respectively associated with different radio reception devices.

In the radio transmission device of the present disclosure, the plurality of CAZAC sequences are a plurality of ZC (Zadoff-Chu) sequences in which a sequence number or a cyclic shift amount is different, each of the plurality of ZC sequences is uniquely associated with parameter information, and the signal generation circuit generates the OOK modulation signal using the ZC sequence associated with the parameter information notified to a radio reception device, from among the plurality of ZC sequences.

A transmission method of the present disclosure includes: generating an OOK (on-off keying) modulation signal by mapping a CAZAC (constant amplitude zero auto-correlation) sequence to N subcarriers (N being an integer that is greater than or equal to 2) arranged at a determined interval among M subcarriers (M being an integer that is greater than or equal to 3) that are adjacent in the frequency domain, carrying out inverse fast Fourier transform (IFFT) processing on the mapped CAZAC sequence, and carrying out Manchester coding on a time domain signal generated by the IFFT processing; and transmitting the generated OOK modulation signal.

INDUSTRIAL APPLICABILITY

An embodiment of the present disclosure is useful in a mobile communication system.

REFERENCE SIGNS LIST

100, 100a, 150, 200, 300, 400 Radio transmission device
101 Allocation instructor
102, 102a, 402, 601 Sequence generator
103, 152 Subcarrier allocator
104 Inverse fast Fourier transformer
105 Manchester coder
106 GI inserter
107 Radio transmitter
108, 501 Antenna
121 ZC sequence generator
122 Sample selector
151 Switching controller
153 Selector
500, 600 Wireless reception device
502 Wireless receiver
503 Low-pass filter
504 GI remover
505 Power detector
506 ON-OFF determiner
201 Phase rotator
301, 403 Cyclic shifter
401, 604 Terminal information mapping table
602 Correlation detector
603 Determiner

The invention claimed is:

1. A communication apparatus, comprising:
  circuitry, which, in operation, generates an on-off keying (OOK) modulation signal by:
  mapping a constant amplitude sequence to 13 subcarriers in a frequency domain, a part of the constant amplitude sequence being allocated at two-subcarrier intervals; and
  multiplying an upper end and a lower end of the 13 subcarriers by a coefficient that is less than 1; and
  a transmitter which, in operation, transmits the OOK modulation signal.

2. The communication apparatus according to claim 1, wherein the circuitry, in operation, generates the OOK modulation signal by carrying out inverse fast Fourier transform (IFFT) processing on the mapped constant amplitude sequence, and carrying out Manchester coding on a time domain signal generated by the IFFT processing.

3. The communication apparatus according to claim 1, wherein the circuitry, in operation, generates the OOK modulation signal by carrying out a phase rotation with respect to the mapped constant amplitude sequence in such a way that a power peak in a time waveform within an ON segment within the OOK modulation signal is arranged in a central portion within the ON segment.

4. The communication apparatus according to claim 1, wherein the circuitry, in operation, generates the OOK modulation signal by carrying out a cyclic shift with respect to a time waveform within the OOK modulation signal in such a way that a power peak in the time waveform within an ON segment within the OOK modulation signal is arranged in a central portion within the ON segment.

5. The communication apparatus according to claim 2, wherein the circuitry, in operation, generates the OOK modulation signal by masking out either a first half segment or a second half segment of the time domain signal in the Manchester coding.

6. A communication method, comprising:
generating an on-off keying (OOK) modulation signal by:
   mapping a constant amplitude sequence to 13 subcarriers in a frequency domain, a part of the constant amplitude sequence being allocated at two-subcarrier intervals; and
   multiplying an upper end and a lower end of the 13 subcarriers in the frequency domain by a coefficient that is less than 1; and
transmitting the OOK modulation signal.

\* \* \* \* \*